United States Patent
Ohlarik et al.

(10) Patent No.: US 11,915,593 B2
(45) Date of Patent: *Feb. 27, 2024

(54) SYSTEMS AND METHODS FOR MACHINE LEARNING BASED COLLISION AVOIDANCE

(71) Applicant: Verizon Patent and Licensing Inc., Basking Ridge, NJ (US)

(72) Inventors: Derek Wade Ohlarik, Flemington, NJ (US); Mauricio Pati Caldeira de Andrada, South Plainfield, NJ (US); Krishna Pichumani Iyer, Basking Ridge, NJ (US); Hoo Dennis Ong, Westerville, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,267

(22) Filed: Sep. 22, 2022

(65) Prior Publication Data

US 2023/0019376 A1 Jan. 19, 2023

Related U.S. Application Data

(63) Continuation of application No. 16/839,824, filed on Apr. 3, 2020, now Pat. No. 11,475,774.

(51) Int. Cl.
*G08G 1/00* (2006.01)
*G06N 20/00* (2019.01)
(Continued)

(52) U.S. Cl.
CPC ............. *G08G 1/20* (2013.01); *G06N 5/04* (2013.01); *G06N 20/00* (2019.01); *G07C 5/008* (2013.01); *G08G 1/07* (2013.01)

(58) Field of Classification Search
CPC ........... G08G 1/20; G08G 1/07; G06N 20/00; G06N 5/04; G07C 5/008
See application file for complete search history.

(56) References Cited

U.S. PATENT DOCUMENTS

| 7,202,776 B2* | 4/2007 | Breed | G08G 1/161 |
| | | | 340/557 |
| 9,457,754 B1* | 10/2016 | Christensen | G08G 1/205 |

(Continued)

OTHER PUBLICATIONS

"3rd Generation Partnership Project; Technical Specification Group Services and System Aspects; Study on L TE Support for V2X Services (Release 14)", Technical Report: 3GPP TR 22.885 V1.0.0 (Sep. 2015), 42 pages.

(Continued)

*Primary Examiner* — Hoi C Lau

(57) ABSTRACT

A device may include a memory storing instructions and processor configured to execute the instructions to receive information relating to a plurality of vehicles in an area. The device may be further configured to use a trained machine learning model to determine a likelihood of collision by one or more of the plurality of vehicles; identify one or more relevant vehicles of the plurality of vehicles that are in danger of collision based on the determined likelihood of collision; and send an alert indicating the danger of collision to at least one of the identified one or more relevant vehicles.

20 Claims, 14 Drawing Sheets

(51) Int. Cl.
*G07C 5/00* (2006.01)
*G08G 1/07* (2006.01)
*G06N 5/04* (2023.01)

(56) References Cited

U.S. PATENT DOCUMENTS

| | | | |
|---|---|---|---|
| 9,925,940 B1* | 3/2018 | Christensen | B60R 21/0136 |
| 10,235,882 B1* | 3/2019 | Aoude | G06N 20/10 |
| 10,399,523 B1* | 9/2019 | Christensen | B60Q 5/006 |
| 10,421,459 B2* | 9/2019 | Goldman-Shenhar | B60W 50/14 |
| 10,565,880 B2* | 2/2020 | Aoude | G08G 1/164 |
| 10,762,786 B1* | 9/2020 | Dewey | B60W 30/0956 |
| 10,814,812 B1* | 10/2020 | Christensen | G08G 1/205 |
| 10,829,071 B1* | 11/2020 | Christensen | B60Q 5/006 |
| 10,854,079 B2* | 12/2020 | Aoude | G08G 1/164 |
| 10,872,531 B2* | 12/2020 | Liu | G06V 20/58 |
| 10,950,130 B2* | 3/2021 | Aoude | G08G 1/166 |
| 11,210,951 B2* | 12/2021 | Takla | G08G 1/166 |
| 11,257,370 B2* | 2/2022 | Aoude | G08G 1/164 |
| 11,257,371 B2* | 2/2022 | Aoude | G06N 20/00 |
| 11,276,311 B2* | 3/2022 | Aoude | G08G 1/0116 |
| 11,328,505 B2* | 5/2022 | Taccari | G06V 10/771 |
| 11,375,344 B2* | 6/2022 | Ong | H04W 4/40 |
| 11,475,770 B2* | 10/2022 | Park | G06N 20/00 |
| 11,475,774 B2* | 10/2022 | Ohlarik | G08G 1/166 |
| 11,516,620 B2* | 11/2022 | Ong | G08G 1/166 |
| 11,526,721 B1* | 12/2022 | O'Malley | G06F 30/15 |
| 11,645,913 B2* | 5/2023 | Takla | G08G 1/164 340/935 |
| 2005/0073438 A1* | 4/2005 | Rodgers | G08G 1/161 340/944 |
| 2005/0134440 A1* | 6/2005 | Breed | G01S 17/931 701/45 |
| 2008/0084283 A1* | 4/2008 | Kalik | B60Q 9/00 701/301 |
| 2009/0228172 A1* | 9/2009 | Markyvech | G01S 13/931 701/423 |
| 2013/0144490 A1* | 6/2013 | Lord | B60T 17/22 701/1 |
| 2013/0293395 A1* | 11/2013 | Ohama | G08G 1/166 340/904 |
| 2015/0035662 A1* | 2/2015 | Bowers | G08G 1/165 340/436 |
| 2015/0348058 A1* | 12/2015 | Liu | G06Q 30/0201 701/31.5 |
| 2017/0287332 A1* | 10/2017 | Ranninger Hernandez | B60W 30/09 |
| 2018/0170372 A1* | 6/2018 | Takamatsu | G08G 1/0145 |
| 2019/0103026 A1* | 4/2019 | Liu | G06V 10/25 |
| 2019/0180624 A1* | 6/2019 | Hassan-Shafique | G08G 1/005 |
| 2019/0205667 A1* | 7/2019 | Avidan | G08G 1/165 |
| 2019/0287394 A1* | 9/2019 | Aoude | G08G 1/163 |
| 2019/0287395 A1* | 9/2019 | Aoude | G08G 1/163 |
| 2019/0287401 A1* | 9/2019 | Aoude | G08G 1/096716 |
| 2019/0287402 A1* | 9/2019 | Aoude | G08G 1/0137 |
| 2019/0287403 A1* | 9/2019 | Aoude | G08G 1/164 |
| 2019/0325754 A1* | 10/2019 | Aoude | G08G 1/0141 |
| 2020/0008044 A1* | 1/2020 | Poornachandran | H04W 24/08 |
| 2020/0062270 A1* | 2/2020 | Park | B60W 30/16 |
| 2020/0066158 A1* | 2/2020 | Park | G06N 3/006 |
| 2020/0159215 A1* | 5/2020 | Ding | G06N 3/045 |
| 2020/0164771 A1* | 5/2020 | Unnervik | B60N 2/42745 |
| 2020/0172093 A1* | 6/2020 | Kum | G05D 1/0088 |
| 2020/0178198 A1* | 6/2020 | Ding | H04W 60/04 |
| 2020/0307564 A1* | 10/2020 | Rahimi | B60W 30/18163 |
| 2020/0388156 A1* | 12/2020 | Aoude | G08G 1/096725 |
| 2021/0009060 A1* | 1/2021 | Huang | G06F 18/2413 |
| 2021/0009121 A1* | 1/2021 | Oboril | B60W 50/0097 |
| 2021/0039639 A1* | 2/2021 | Song | G01C 21/3415 |
| 2021/0046924 A1* | 2/2021 | Caldwell | B60W 30/0956 |
| 2021/0065551 A1* | 3/2021 | Manohar | G08G 1/0129 |
| 2021/0090358 A1* | 3/2021 | DiCarlo | G07C 5/0808 |
| 2021/0139025 A1* | 5/2021 | Kim | G06N 3/08 |
| 2021/0171027 A1* | 6/2021 | Kang | G06V 20/58 |
| 2021/0197720 A1* | 7/2021 | Houston | G06N 3/045 |
| 2021/0256257 A1* | 8/2021 | Taccari | G06V 20/56 |
| 2021/0280064 A1* | 9/2021 | Takla | G08G 1/164 |
| 2021/0312811 A1* | 10/2021 | Ohlarik | G06N 5/04 |
| 2021/0375138 A1* | 12/2021 | Aoude | G06N 20/00 |
| 2022/0032965 A1* | 2/2022 | Feifel | G06N 3/02 |
| 2022/0046381 A1* | 2/2022 | Ong | G08G 1/164 |
| 2022/0046391 A1* | 2/2022 | Ong | H04W 4/60 |
| 2022/0060928 A1* | 2/2022 | Jung | G08G 1/0112 |
| 2022/0076578 A1* | 3/2022 | Takla | G08G 1/056 |
| 2022/0103985 A1* | 3/2022 | Khasnabish | H04W 4/50 |
| 2022/0135075 A1* | 5/2022 | Ng | G06V 20/56 701/301 |
| 2022/0245935 A1* | 8/2022 | Taccari | G08G 1/164 |
| 2022/0303734 A1* | 9/2022 | Ong | H04W 4/40 |
| 2022/0314971 A1* | 10/2022 | Wang | B60W 30/095 |
| 2022/0413502 A1* | 12/2022 | Keski-Valkama | G05D 1/0088 |
| 2023/0019376 A1* | 1/2023 | Ohlarik | G08G 1/07 |
| 2023/0107449 A1* | 4/2023 | Ong | H04W 4/022 455/456.1 |

OTHER PUBLICATIONS

"Intelligent Transport Systems (ITS); Vehicular Communications; Basic Set of Applications; Definitions", Technical Report: ETSI TR 102 638 V1.1.1 (Jun. 2009), 81 pages.

* cited by examiner

SYSTEMS AND METHODS FOR MACHINE LEARNING BASED COLLISION AVOIDANCE

CROSS-REFERENCE TO RELATED APPLICATIONS

This patent application is a continuation of U.S. patent application Ser. No. 16/839,824, filed on Apr. 3, 2020, and titled "SYSTEMS AND METHODS FOR MACHINE LEARNING BASED COLLISION AVOIDANCE," the disclosure of which is hereby incorporated by reference in its entirety.

BACKGROUND INFORMATION

A vehicle may include a computer device that collects information relating to the vehicle. For example, the computer device may collect information relating to the vehicle's location. The vehicle information may be sent, received, and stored for use in various telematics applications, such as, for example, vehicle tracking, navigation, or fleet management. Processing telematics information may pose various challenges.

DETAILED DESCRIPTION OF PREFERRED EMBODIMENTS

Figure 1:
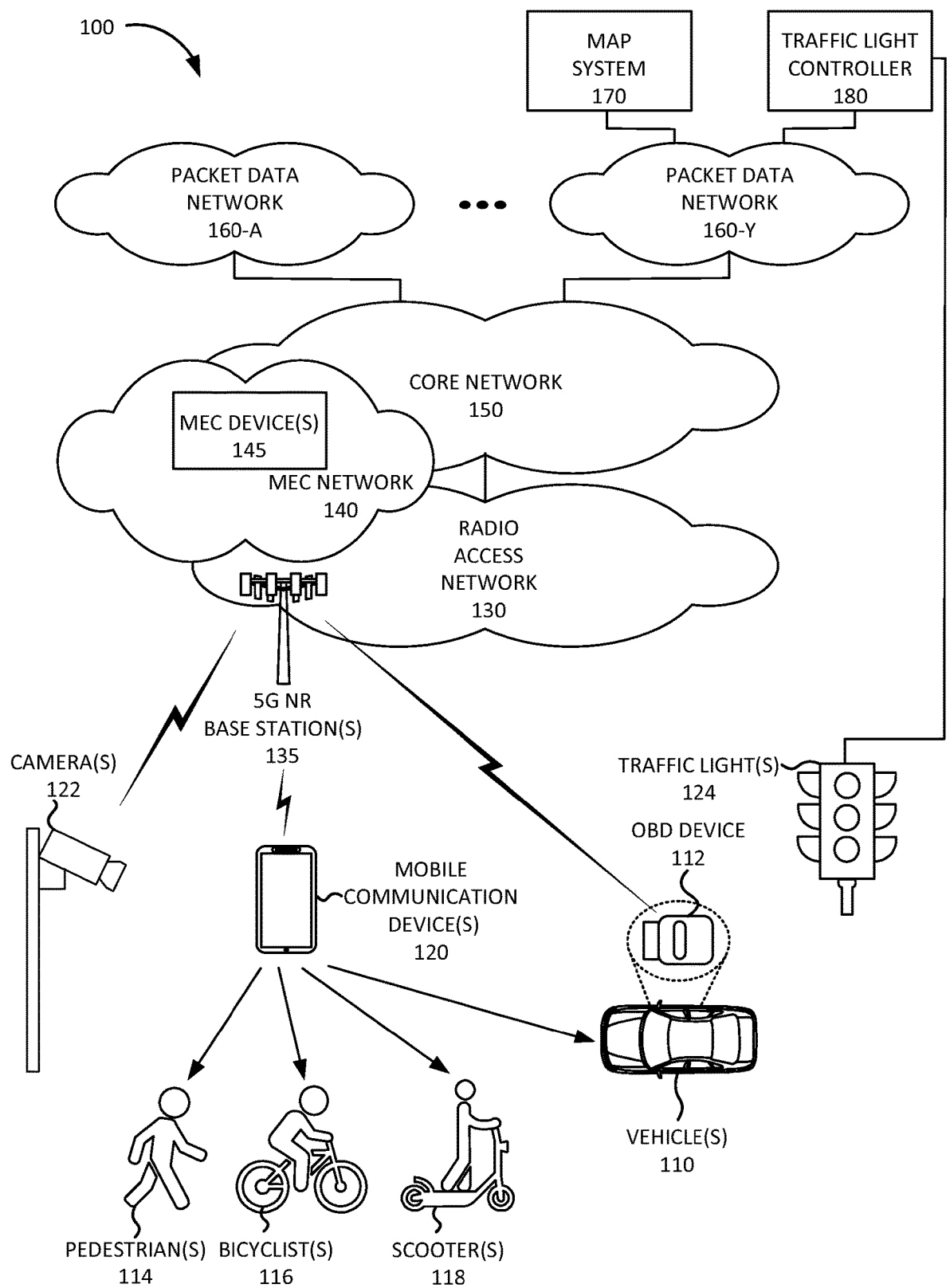
FIG. 1 illustrates an environment according to an implementation described herein.

The following detailed description refers to the accompanying drawings. The same reference numbers in different drawings identify the same or similar elements.

Collisions caused by vehicles hitting other street entities, such as, for example, vehicles, pedestrians, bicycles, or electric scooters, cause significant amounts of property damage, injuries, and even loss of life. Minimizing a number of collisions caused by vehicles has long been a goal of drivers, car manufacturers, transportation engineers, and urban planners. However, as a goal, collision avoidance poses various technological challenges, such as, for example, tracking large numbers of vehicles present in many areas and handling a large number of different situations that may arise and lead to the danger of a collision.

Implementations described herein relate to a collision avoidance system implemented on one or more computer devices. The computer device(s) may be configured to receive information relating to vehicles in an area, using a trained machine learning model to determine a likelihood of collision by one or more of the of vehicles, identify one or more relevant vehicles of the vehicles that are in danger of collision based on the determined likelihood of collision, and send an alert to at least one of the identified relevant vehicles indicating the danger of collision.

Receiving the information relating to the vehicles in the area may include receiving information from on-board diagnostics (OBD) devices in the vehicles. The OBD information, for a particular vehicle, may include one or more of a Real-Time Kinematic (RTK) position for the particular vehicle, a heading for the particular vehicle, a speed for the particular vehicle, an acceleration for the particular vehicle, a type of vehicle for the particular vehicle, a vehicle component status for the particular vehicle (e.g., brake status, turn signal status, gear status, etc.). RTK positioning may be used to enhance Global Positioning System (GPS) information using a reference station and may be able to determine the position down to a centimeter (cm) range.

Receiving the information relating to the vehicles in the area may include receiving object detection information from cameras located in the area. In some implementations, the cameras may be mounted on poles or other elevated structures in the area. In other implementations, the cameras may include mobile cameras, such as, for example, cameras included in mobile communication devices or vehicles. The object detection information may include information identifying a location of an object and information identifying the type of street entity or object. The type of street entity or object may include at least one of a vehicle, a pedestrian, a bicycle, a scooter, and/or another type of street entity or object. Furthermore, in some implementations, receiving the information relating to the vehicles in the area may include receiving pedestrian location information from mobile communication devices associated with vehicles, pedestrians, and/or bicyclists or other objects in the area (e.g., unmanned drones, etc.).

Furthermore, the computer device(s) may be configured to obtain traffic light information from traffic light controllers located in the area. In some aspects, the traffic light controllers may push traffic light/timing information to the device(s) according to a predetermined schedule. The trained machine learning model may also receive the traffic light information as an input in order to determine the likelihood of collision by the vehicles.

Furthermore, the computer device may be configured to obtain information relating to street entities. For example, the computer device may be configured to obtain at least one of pedestrian information for pedestrians in the area, bicycle information for bicyclists in the area, and/or electric scooter information for electric scooters in the area, and the trained machine learning model to determine the likelihood of collision by the one or more of the vehicles may take as inputs the obtained pedestrian information, bicycle information, and/or electric scooter information.

The trained machine learning model may include a first machine learning model trained to predict future trajectories for particular ones of the vehicles, a second machine learning model trained to predict future trajectories for pedestrians in the area, and a third machine learning model trained to determine the likelihood of collision based on the predicted future trajectories for particular ones of the vehicles and the predicted future trajectories for the pedestrians in the area. Furthermore, the trained machine learning model may include other machine learning models, such as a machine learning model trained to predict future trajectories for bicyclists in the area, a machine learning model trained to predict future trajectories for electric scooters in the area, etc. The machine learning model trained to determine the likelihood of collision may take as inputs the predicted trajectories from these other machine learning models as additional inputs.

The machine learning models may be trained using particular collision danger situations. For example, the particular collision danger situations may include a pedestrian ahead situation, a left turn situation, a lane change situation, an intersection movement situation, an emergency braking ahead situation, a do not pass situation, a blind intersection situation, and/or another type of traffic situation. These collision danger situations are described in more detail later with reference to FIGS. 7-14.

Furthermore, a collision avoidance system needs to be able to operate and generate warning within short periods of time, often only a few seconds, during which a collision situation arises and takes place, and the large number of possible situations that may arise when moving vehicles are involved. Thus, any technological solution addressing collision avoidance may require significant computational resources as well as low latency for messages sent and/or received by vehicles.

The required low latency, high processing capacity, and high processing speed may be achieved with a wireless Fifth Generation (5G) New Radio (NR) connection to a base station and a Multi-access Edge Computing (MEC) network associated with the base station. The 5G NR air interface technology, which may use millimeter (mm) wave frequencies, may provide for high bandwidth and low latency communication, in comparison to other wireless network technologies. In order to further reduce latency and/or other parameter values associated with network performance, to reduce the traffic load in core networks and gateway devices, and to provide more efficient services, a communication service provider that manages a Radio Access Network (RAN) may deploy a MEC network that includes one or more MEC devices. The MEC devices in the MEC network may provide various services, to user equipment (UE) devices wirelessly connected to a particular base station.

The MEC network may be located in geographic proximity to a base station, and/or may be close to the base station from a network topology perspective. For example, the MEC network may be physically closer to the base station than to other base stations, and/or may be reached with fewer network device traversals ("hops") than traffic from other base stations or traffic destined to devices in other packet data networks, such as a cloud computing center located in a core network or private packet data network. When a UE device requests a service that is available via a MEC network, the UE device may be connected to a MEC device in the MEC network, rather than to an application server in the core network or an external packet data network (e.g., the Internet). Different MEC networks may service different sets of base stations. A set of MEC networks distributed in different locations may be referred to as a "distributed edge" or "distributed edge computing." A collision avoidance system, as described herein, may be located in a MEC network associated with a 5G NR base station that communicates with vehicles in the area managed by the collision avoidance system using 5G NR wireless signals.

A collision avoidance system located in a MEC network may communicate with vehicles, cameras, mobile communication devices, and/or other types of devices via a base station using 5G NR wireless signals. The collision avoidance system may generate a collision danger alert at a significantly lower latency than systems on other types of networks and/or devices using another form of wireless communication technology. For example, the collision avoidance system in a MEC network communicating with a vehicle using 5G NR wireless signals may receive information from a vehicle, analyze the information to determine the likelihood of a collision, and send a warning back to the vehicle within 10 milliseconds (ms). In comparison, other wireless network technologies may experience latencies of 100 ms or more, which may not be adequate to warn a vehicle in time to avoid a collision.

In some implementations, the messages received and sent by the collision avoidance system may be Dedicated Short-Range Communications (DSRC) messages. DSRC messages may be transmitted in the 5.9 Gigahertz (GHz) band allocated by the Federal Communications Commission (FCC) for intelligent transportation systems. In other implementations, the messages received and sent by the collision avoidance system may be in a different band, channel, and/or format.

FIG. 1 is a diagram of an exemplary environment 100 in which the systems and/or methods, described herein, may be implemented. As shown in FIG. 1, environment 100 may include one or more vehicles 110, pedestrians 114, bicyclists 116, scooters 118, mobile communication devices 120, cameras 122 (referred to herein collectively as "cameras 122" and individually as "camera 122"), traffic lights 124, a radio access network (RAN) 130, a MEC network 140, a core network 150, and packet data networks 160-A to 160-Y, a map system 170, and a traffic light controller 180. Vehicles 110, pedestrians 114, bicyclists 116, scooters 118, mobile communication devices 120, cameras 122, traffic lights 124, and packet data networks 160 may be referred to herein collectively as "vehicles 110," "pedestrians 114," "bicyclists 116," "scooters 118," "mobile communication devices 120," "cameras 122," "traffic lights 124," and "packet data networks 160" and individually as "vehicle 110," "pedestrian 114," "bicyclist 116," "scooter 118," "mobile communication device 120," "camera 122," "traffic light 124," and "packet data network 160," respectively.

Vehicles 110 may include motorized vehicles in an area serviced by RAN 130. Each vehicle may include an OBD device 112 installed in the vehicle. OBD device 112 may be plugged into the OBD port of vehicle 110 and may collect information relating to the status and operation of vehicle 110. Furthermore, OBD device 112 may include a collection of sensors, such as position, bearing, and/or acceleration sensors, that generate information relating to the movement of vehicle 110. OBD device 112 may communicate with MEC network 140 via RAN 130 using 5G NR wireless signals.

Pedestrians 114 may include pedestrians in the area associated with vehicles 110. Bicyclists 116 may include moving bicyclists in the area associated with vehicles 110. Scooters 118 may include moving electric scooters in the area associated with vehicles 110. Mobile communication devices 120 may be associated with particular vehicles 110, pedestrians 114, bicyclists 116, and/or scooters 118. For example, a driver of vehicle 110, pedestrian 114, bicyclist 116, and/or a user of scooter 118 may each have in possession a mobile communication device 110.

Mobile communication device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer device with wireless communication capabilities and/or a user interface. Mobile communication device 110 may communicate with MEC network 140 via RAN 130 using 5G NR wireless signals.

Cameras 122 may be installed throughout the area associated with vehicles. Cameras 122 may be installed on poles, buildings, and/or other structures in positions that enable capturing of images of vehicles 110, pedestrians 114, bicyclists 116, and/or scooters 118 in the area. Camera 122 may include a digital camera for capturing and digitizing images using an array of sensors. The captured image data may include a continuous image sequence (e.g., video), a limited image sequence, still images, and/or a combination thereof. Cameras 122 may capture image and/or video data using visible light, infrared light, and/or other non-visible electromagnetic radiation (e.g., ultraviolet light, infrared light, terahertz radiation, etc.). In some implementations, camera 122 may include a depth camera that captures depth information. For example, for each pixel, the depth camera may obtain color information as well as depth information. In some implementations, camera 122 may include one or more illumination sources. The illumination sources may include a visible light illumination source and/or an infrared illumination source. For example, camera 122 may emit a set of infrared or near-infrared beams to obtain depth information. Additionally, or alternatively, camera 122 may include a thermal camera and/or radar device for radar imaging.

Camera 122 may include wireless communication functionality to transmit captured images or video of vehicles 110, pedestrians 114, bicyclists 116, and/or scooters 118 to MEC network 140 via RAN using 5G NR wireless signals. In some implementations, camera 122 may transmit captured raw images or video to MEC network 140. In other implementations, camera 122 may perform object recognition to identify particular vehicles 110, pedestrians 114, bicyclists 116, and/or scooters 118 in the captured images or videos and/or determine the position, bearing, speed, and/or acceleration of particular vehicles 110, pedestrians 114, bicyclists 116, and/or scooters 118 in the captured images or videos.

Traffic lights 124 may be located in the area associated with vehicles 110, pedestrians 114, bicyclists 116, and/or scooters 118 and may include signaling devices to control the flow of traffic at road intersections, bicycle trails, and/or pedestrian crossings. Traffic lights 124 may be controlled by one or more traffic light controllers 180.

RAN 130 may include one or more 5G NR base stations 135. Each 5G NR base stations 135 may include devices and/or components configured to enable wireless communication with OBD devices 112, mobile communication devices 120, cameras 122, and/or other devices perceived as UE devices by 5G NR base station 135. 5G NR base station 135 may be configured to communicate with UE devices as a gNodeB that uses a 5G NR air interface. A gNodeB may include one or more antenna arrays configured to send and receive wireless signals in the mm-wave frequency range. Additionally, 5G NR base station 135 may include a Fourth Generation (4G) base station configured to communicate with UE devices as an eNodeB that uses a 4G Long Term Evolution (LTE) air interface.

Furthermore, RAN 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. 5G NR base station 135 may be associated with MEC network 140.

MEC network 140 may provide MEC services for UE devices attached to 5G NR base station 135. MEC network 140 may be in proximity to the one or more 5G NR base stations 135 from a geographic and network topology perspective. As an example, MEC network 140 may be located on a same site as 5G NR base station 135. As another example, MEC network 140 may be geographically closer to 5G NR base station 135, and reachable via fewer network hops and/or fewer switches, than other base station and/or packet data networks 160. As yet another example, MEC network 140 may be reached without having to interface with a gateway device, such as a 4G Packet Data Network Gateway (PGW) or a 5G User Plane Function (UPF).

MEC network 140 may interface with RAN 130 and/or with core network 150 via a MEC gateway device (not shown in FIG. 1). In some implementations, MEC network 140 may be connected to RAN 130 via a direct connection to 5G NR base station 135. For example, MEC network 140 may connect to a gNodeB via an N3 interface. In other implementations, MEC network 140 may include, or be included in, core network 150. As an example, MEC network 140 may connect to a Session Management Function (SMF) via an N4 interface. MEC network 140 may support UE device mobility and handover application sessions between MEC network 140 and another MEC network.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs.

MEC device 145 may connect to 5G NR base station 135 in RAN 130 and provide one or more MEC services to UE devices connected to 5G NR base station 135. As an example, a MEC service may include a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, use of GPUs for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, implementation of a virtual network function (VNF), and/or another type of network service. As yet another example, a MEC service may include control of Internet of Things (IoT) devices, such as hosting an application server for autonomous vehicles, a security system, a manufacturing and/or robotics system, and/or another type of IoT system. Consistent with implementations described herein, MEC device 145 may include a collision avoidance system to analyze information received from OBD devices 112, mobile communication devices 120, cameras 122, map system 170, and/or traffic light controllers 180 to determine a likelihood of collision involving vehicles 110 and to generate alerts to be sent to vehicles 110 and/or mobile communication devices 120 in order to prevent a collision.

Core network 150 may manage communication sessions for UE devices serviced by 5G NR base station 135. For example, core network 150 may establish an Internet Protocol (IP) connection between UE devices and a packet data network 160. Furthermore, core network 150 may enable UE devices to communicate with an application server, and/or another type of device, located in a packet data network 160 using a communication method that does not require the establishment of an Internet Protocol (IP) connection between a UE device and packet data network 160, such as, for example, Data over Non-Access Stratum (DoNAS). For example, in other implementations, a collision avoidance system may be included in a server device in core network 150, rather than in MEC device 145 in MEC network 140.

In some implementations, core network 150 may include an LTE core network (e.g., an evolved packet core (EPC) network). An EPC network may include devices that implement: network functions that include a Mobility Management Entity (MME) for control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 160; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 150 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

Packet data networks 160-A to 160-N may each include a packet data network. A particular packet data network 160 may be associated with an Access Point Name (APN) and a UE device may request a connection to the particular packet data network 160 using the APN. Packet data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Map system 170 may include one or more computer devices, such as server devices, configured to generate and/or maintain maps of the area associated with 5G NR base station 135 and vehicles 110. A map of the area may include the location of streets and street lanes, buildings and other structures, traffic lights, pedestrian walkways and pedestrian crossings, bicycle trails and bicycle trail crossings, and/or other information that may be used by a collision avoidance system to prevent collisions. Map system 170 may provide maps of the area to MEC device 145.

Traffic light controller 180 may include one or more computer devices, such as server devices, configured to control traffic lights 124. Traffic light controller 180 may provide information relating to the status of particular traffic lights 124 to MEC device 145. Furthermore, in some implementations, traffic light controller 180 may receive instructions from MEC device 145. For example, MEC device 145 may instruct traffic light controller 180 to extend the duration of a red or green traffic light of a particular traffic light 124 to reduce the likelihood of a collision at a particular intersection.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
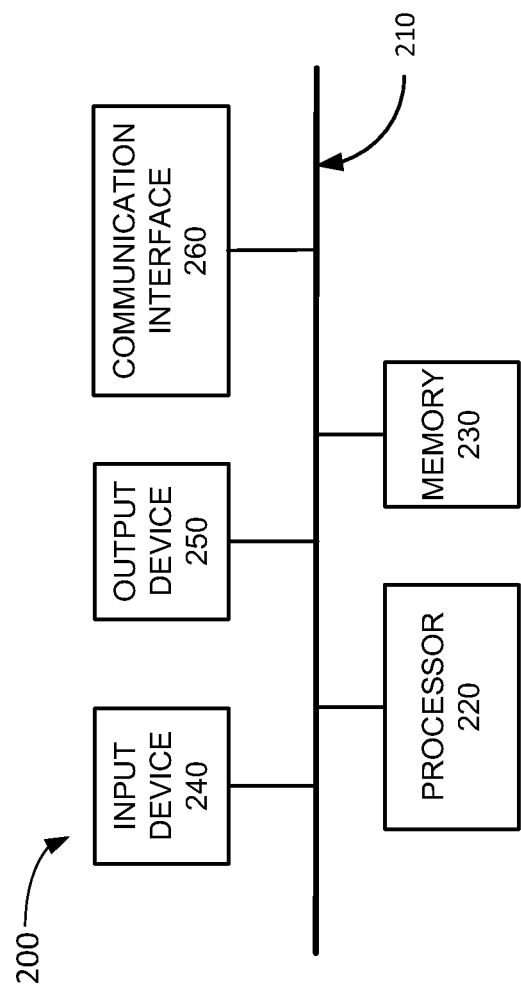
FIG. 2 illustrates exemplary components of a device that may be included in the environment of FIG. 1 according to an implementation described herein.

FIG. 2 is a diagram illustrating example components of a device 200 according to an implementation described herein. OBD device 112, mobile communication device 120, camera 122, base station 135, MEC device 145, map system 170, and/or traffic light controller 180 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to collision danger detection and alerts. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
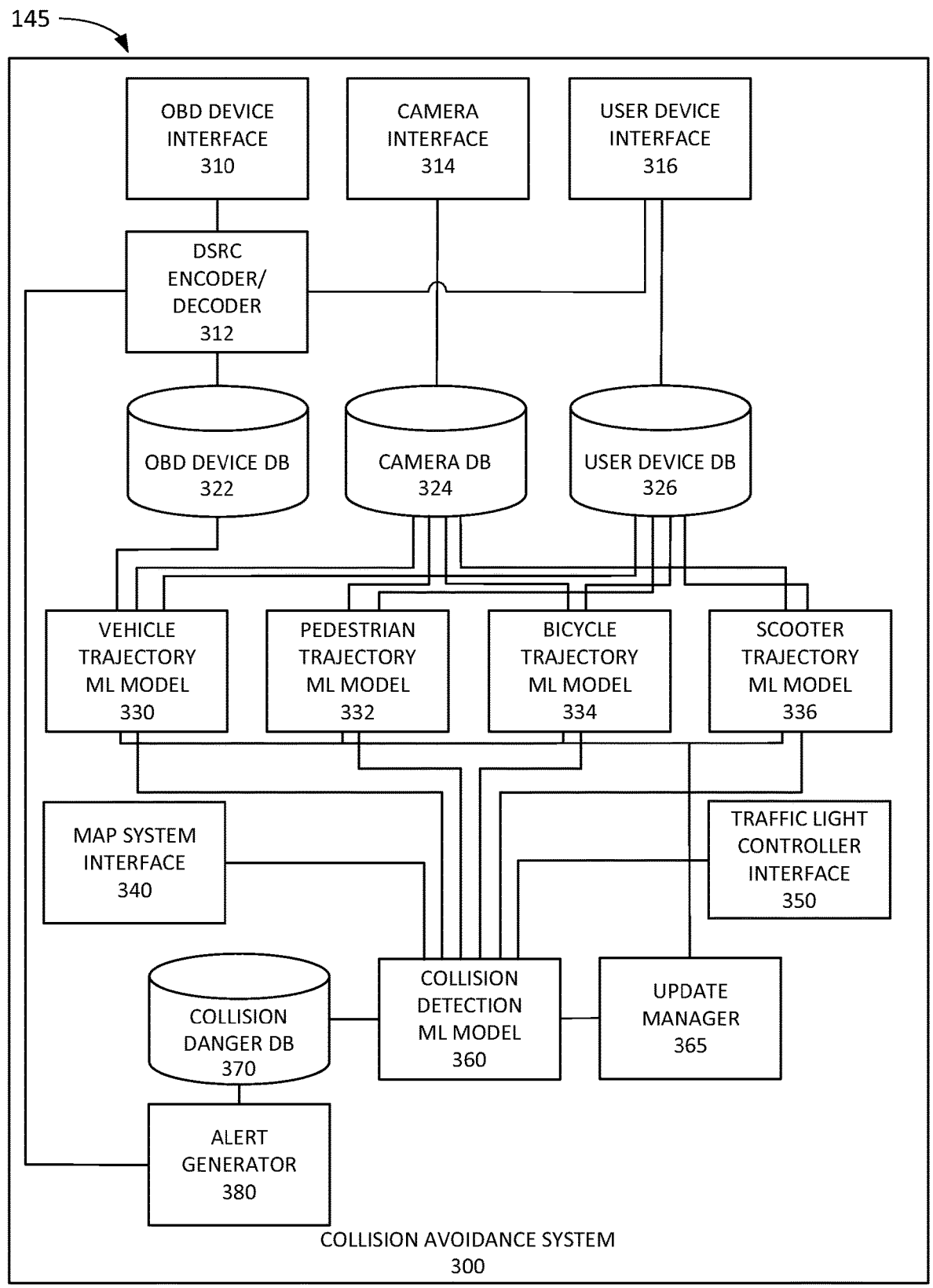
FIG. 3 illustrates exemplary components of the Multi-access Edge Computing (MEC) device of FIG. 1 according to an implementation described herein.

FIG. 3 is a diagram illustrating exemplary components of MEC device 145. The components of MEC device 145 may be implemented, for example, via processor 220 executing instructions from memory 230. Alternatively, some or all of the components of MEC device 145 may be implemented via hard-wired circuitry. Furthermore, some or all of the components of MEC device 145 may be implemented using one or more hardware accelerators, such as GPUs, tensor or dataflow processing units, and/or other types of hardware accelerators.

As shown in FIG. 3, MEC device 145 may include a collision avoidance system 300. Collision avoidance system 300 may perform collision danger detection and alert generation for vehicles 110, pedestrians 114, bicyclists 116, and/or scooters 118 in an area. Although collision avoidance system 300 is shown as being included in MEC device 145, in other implementations, some or all of the components of collision avoidance system 300 may be implemented in a device outside of MEC network 140 (e.g., in core network 150) and may be coupled to low latency device (e.g., hardware accelerators) of MEC device 145 as needed to perform low latency processing. As shown in FIG. 3, collision avoidance system 300 may include an OBD device interface 310, a DSRC encoder/decoder 312, an OBD device database (DB) 322, a camera interface 314, a camera DB 324, a user device interface 316, a user device DB 326, a vehicle trajectory machine learning (ML) model 330, a pedestrian trajectory ML model 332, a bicycle trajectory ML model 334, a scooter trajectory ML model 336, a map system interface 340, a traffic light controller interface 350, a collision detection ML model 360, an update manager 365, a collision danger DB 370, and an alert generator 380. In some implementations, particular components of MEC device 145 may be included in different virtual containers (e.g., Kubernetes containers, etc.).

OBD device interface 310 may be configured to communicate with OBD device 112. DSRC encoder/decoder 312 may decode a DSRC message received from OBD device 112 to retrieve vehicle information from the DSRC, such as, for example, the position, bearing, speed, and/or acceleration of vehicle 110 and/or the status of various components of vehicle 110, such as, for example, the status of turn signals, brakes, gears, etc. DSRC encoder/decoder 312 may store the retrieved information in OBD device DB 322. Furthermore, DSRC encoder/decoder 312 may receive an alert from alert generator 380 and may encode the alert into a DSRC message to be sent to OBD device 112 (and/or to mobile communication device 120).

Camera interface 314 may be configured to communication with cameras 122. For example, camera interface 314 may receive information from cameras 122 and store the received information in camera DB 324. In some implementations, the information may include captured images and/or videos. In other implementation, the information may include object detection information based on object detection performed by cameras 122 on captured images and/or videos. If camera interface 314 receives images and/or video, camera interface 314 may perform object recognition to identify particular types of street entities, such as, for example, vehicles 110, pedestrians 114, bicyclists 116, and/or scooters 118, in the received images and/or videos using one or more machine learning models. The machine learning models may include a convolutional neural network (CNN) and/or another type of deep learning neural network trained to identify vehicles, pedestrians, bicyclists, and/or scooters. In other implementations, the machine learning model may use a different type of computer vision model trained to identify vehicles, pedestrians, bicyclists, and/or scooters, such as, for example, a region growing method, a level-set method, a graph cut method, a watershed method, a dynamic programming method, and/or another type of segmentation technique.

User device interface 316 may be configured to communicate with mobile communication devices 120. For example, user device interface 316 may receive information, such as the position, bearing, speed, and/or acceleration of a person carrying mobile communication device 120, such as a driver or passenger in vehicle 110, pedestrian 114, bicyclist 116, or operator of scooter 118. User device interface 316 may store the received information in user device DB 326. Furthermore, user device interface 316 may receive an alert from DSRC encoder/decoder 312 and may forward the alert to mobile communication device 120. In some implementations, OBD interface 310, camera interface 314, and/or user interface 316 may include a message broker that utilizes a Messaging and Queueing Telemetry Transport (MQTT) protocol to communicate with OBD devices 112, cameras 112, and/or mobile communication devices 120. The message broker may communicate with DSRC encoder/decoder 312. For example, DSRC encoder/decoder 312 may generate a DSRC safety message and the message broker may forward the generated DSRC safety message to the destination OBD device 112 and/or mobile communication device 120 using the MQTT protocol.

Vehicle trajectory ML model 330 may be trained to predict future trajectories of vehicles 110 based on information stored in OBD device DB 322, camera DB 324, and/or user device DB 326. Pedestrian trajectory ML model 332 may be trained to predict future pedestrian trajectories of pedestrians 114 based on information stored in camera DB 324 and/or user device DB 326. Bicycle trajectory ML model 334 may be trained to predict future bicyclist trajectories of bicyclists 116 based on information stored in camera DB 324 and/or user device DB 326. Scooter trajectory ML model 336 may be trained to predict future scooter trajectories of scooters 118 based on information stored in camera DB 324 and/or user device DB 326.

Map system interface 340 may receive map information from map system 170 and provide the map information to collision detection ML model 360. Traffic light controller interface 350 may receive traffic light status information from traffic light controller 180 and provide the traffic light status information to collision detection ML model 360. Collision detection ML model 360 may determine the likelihood of a collision between a particular vehicle 110 and another vehicle 110, pedestrian 114, bicyclist 116, or scooter 118 based on information, which is received from map model 170 and traffic light controller 180, and based on the trajectories predicted by vehicle trajectory ML model 330, pedestrian trajectory ML model 332, bicycle trajectory ML model 334, and/or scooter trajectory ML model 336.

Collision detection ML model 360, vehicle trajectory ML model 330, pedestrian trajectory ML model 332, bicycle trajectory ML model 334, and/or scooter trajectory ML model 336 may each include a trained deep learning neural network, or another type of machine learning classifier, such as, for example, a Support Vector Machine (SVM) classifier, a K-nearest neighbors (KNN) classifier, a naive Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc.

Vehicle trajectory ML model 330 may generate an input vector for vehicle 110 that includes a first set of input elements that represent telemetry measurements and a second set of input elements that includes changes in location and may generate an output vector that represents a change in location for upcoming consecutive time intervals. For example, vehicle trajectory ML model 330 may generate an input vector for vehicle 110 that includes a set of 20 elements representing a flattened 5 by 4 matrix of five telemetry elements that include the speed, angular velocity, linear velocity, angular acceleration, and linear acceleration of vehicle 110; a set of 10 elements representing a flattened 5 by 2 matrix of changes in the latitude and longitude of vehicle 110 between the two most recent consecutive measurements; and a set of 30 elements representing a flattened 15 by 2 matrix of changes in the latitude and longitude of vehicle 110 between 15 consecutive positions, starting with the most recent position. The output vector for vehicle 110 may include a set of 100 elements representing the latitude and longitude for 50 consecutive predicted points of the predicted trajectory for the upcoming 5 second time intervals at 100 millisecond intervals.

Similarly, pedestrian trajectory ML model 332 may generate an input vector for pedestrian 114 that includes a first set of input elements that represent telemetry measurements and a second set of input elements that includes changes in location and may generate an output vector that represents a change in location for upcoming consecutive time intervals. For example, pedestrian trajectory ML model 332 may generate an input vector for pedestrian 114 that includes a set of 10 elements representing a flattened 5 by 2 matrix of the speed and linear acceleration of pedestrian 114 an a set of 10 elements representing a flattened 5 by 2 matrix of 5 most recent changes in the latitude and longitude of pedestrian 114. The output vector for pedestrian 114 may include a set of 100 elements representing the latitude and longitude for 50 consecutive predicted points of the predicted trajectory for the upcoming 5 second time intervals at 100 millisecond intervals. Bicycle trajectory ML model 334 and scooter trajectory ML model 336 may generate input and output vectors similar to those described above for pedestrian trajectory ML model 332.

Collision detection ML model 360 may take as input the output vectors generated by vehicle trajectory ML model 330, pedestrian trajectory ML model 332, bicycle trajectory ML model 334, and scooter trajectory ML model 336 and may generate an output vector that represents the likelihood of a collision occurring during a particular time interval. For example, collision detection ML model 360 may generate an output vector with 51 elements, with each element representing a collision class during a time interval in the future. Thus, class 0 may represent the likelihood of a collision in the next 0.1 seconds, class 1 may represent the likelihood of a collision in the next 0.2 seconds, etc. Class 50 may represent the likelihood of a collision in 5 seconds and class 51 may represent the likelihood of there being no collision in the next 5 seconds.

Collision detection ML model 360, as well vehicle trajectory ML model 330, pedestrian trajectory ML model 332, bicycle trajectory ML model 334, and/or scooter trajectory ML model 336 may perform collision analysis for a particular vehicle 110 and another vehicle 110 or another type of street entity, such as pedestrian 114, bicyclist 116, and/or scooter 118. If a collision danger (e.g., detecting a generated likelihood that is higher than a collision danger threshold) is detected for the particular vehicle 110 and the other vehicle 110 or street entity, the particular vehicle 110 and the other vehicle 110 or another type of street entity may be identified as relevant and stored in connection with the collision danger event in collision danger DB 370.

Collision detection ML model 360, vehicle trajectory ML model 330, pedestrian trajectory ML model 332, bicycle trajectory ML model 334, and/or scooter trajectory ML model 336 may be trained using particular collision situations. The training collision situations may be simulated using motorized models, using computer simulations of trajectories, and/or using another technique. The collision situations may include, for example, a pedestrian ahead situation in which a vehicle approaches a pedestrian crossing the street; a left turn situation in which a vehicle is making a left turn across on-coming traffic; a lane change situation in which a vehicle is changing lanes with another vehicle is obscured from view; an intersection movement situation in which multiple vehicles are crossing an intersection at the same time; an emergency braking ahead situation in which a first vehicle brakes suddenly while multiple vehicles are behind the first vehicle; a do not pass situation which a vehicle attempts to pass into oncoming traffic; a blind intersection situation in which a vehicle enters an intersection that includes a blind spot not visible to a driver of a vehicle; and/or other types of potential collision situations. In some implementations, the training situations may include fields of view for particular vehicles and collision detection ML model 360 may model a field of view for particular vehicles 110 to determine a likelihood that the driver of a vehicle 110 will notice another vehicle 110, pedestrian 114, bicyclist 116, and/or scooter 118 based on potential obstructions to the driver's field of view determined based on the map information received from map system 170.

Collision detection ML model 360 may store information relating to determined likelihoods of collision for vehicles 110 during particular time periods in collision danger DB 370. Exemplary information that may be stored in collision danger DB 370 is described below with reference to FIG. 4. The information stored in collision danger DB 370 may be used to generate alerts to be sent to relevant vehicles 110 that are determined to be in danger of a collision.

Update manager 365 may update vehicle trajectory ML model 330, pedestrian trajectory ML model 332, bicycle trajectory ML model 334, scooter trajectory ML model 336, and/or collision detection ML model 360 to improve modeling and/or performance. For example, update manager 365 may provide feedback based on observation of trajectories compared to predicted trajectories and may update the machine learning models based on the observed trajectories to improve future predictions of trajectories. Similarly, update manager 365 may update collision detection ML model 360 based on detected collisions compared to predicted collision danger events. For example, if a collision occurs that was not predicted, update manager 365 may train collision detection ML model 360 based on the particular scenario (e.g., observed trajectories, status of traffic lights, etc.) that led to the detected collision.

Alert generator 380 may generate an alert based on information stored in collision danger DB 370, determine one or more relevant vehicles 110 associated with the alert, and send the alert to the OBD devices 112 associated with the determined one or more vehicles 110. In some implementations, alert generator 380 may additionally identify mobile communication devices 120 associated with the alert, and send the alert to the identified mobile communication devices 120. The relevant vehicles 110 may be identified based on information stored in collision danger DB 370 for a collision danger event and the alerts may be routed to OBD devices 112 associated with the identified relevant vehicles 110 by OBD device interface 310. In some implementations, alerts may also be routed to mobile communication devices 120 associated with identified relevant vehicles 110 and/or other types of street entities by user device interface 316. For example, OBD device interface 310 and/or user device interface 316 may store determine a destination address for an OBD device 112 or mobile communication device 120 based on an identifier associated with the identified relevant OBD device 112 or mobile communication device 120 (e.g., an IP address, a Mobile Directory Number (MDN), an International Mobile Subscriber Identity (IMSI), a Mobile Station International Subscriber Directory Number (MSISDN), an International Mobile Equipment Identity (IMEI), etc.).

Although FIG. 3 shows exemplary components of MEC device 145, in other implementations, MEC device 145 may include fewer components, different components, differently arranged components, or additional components than depicted in FIG. 3. Additionally, or alternatively, one or more components of MEC device 145 may perform functions described as being performed by one or more other components of MEC device 145.

Figure 4:
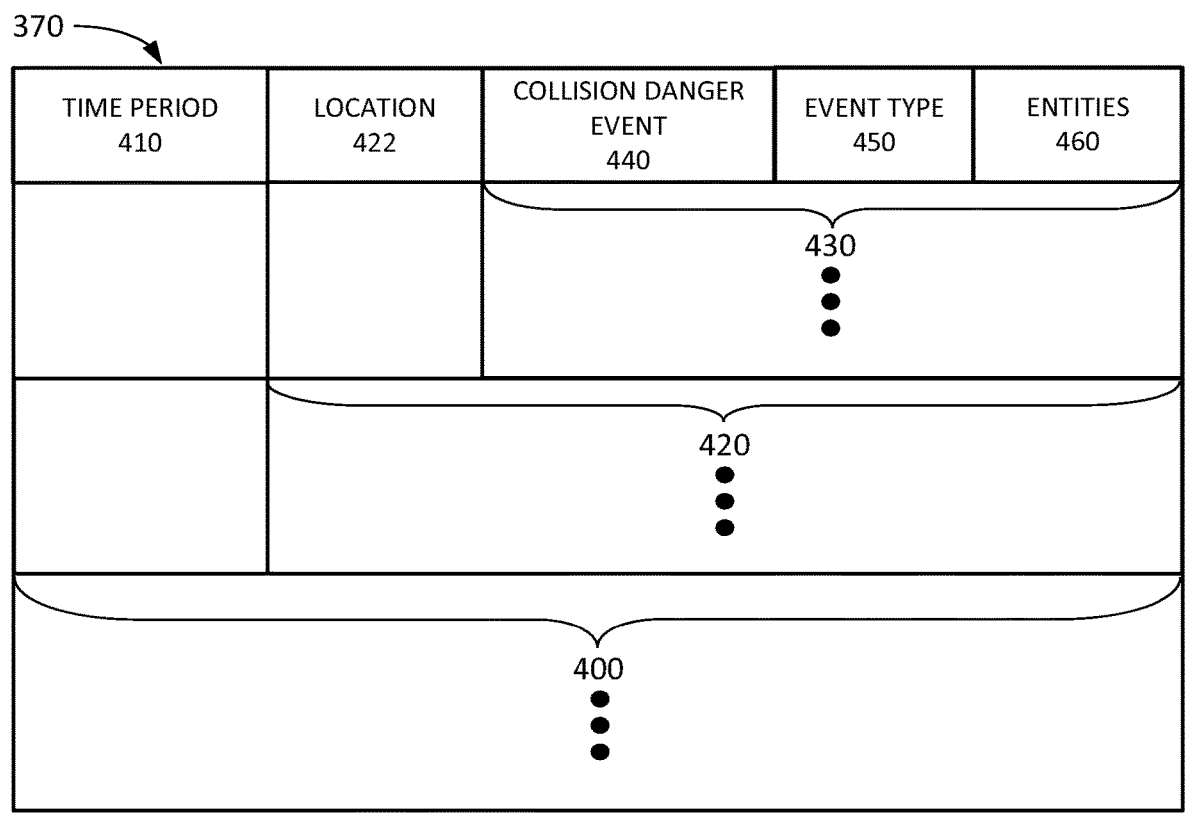
FIG. 4 illustrates exemplary components of the collision danger database of FIG. 3 according to an implementation described herein.

FIG. 4 is a diagram illustrating exemplary information stored in collision danger DB 370 according to an implementation described herein. As shown in FIG. 4, collision danger DB 370 may include one or more time period records 400. Each time period record 400 may store information relating to a particular time period associated with collision avoidance system 300. Each event record 500 may include one or more location records 420. Each location record 420 may store information relating to a particular location. Location record 420 may include a location field 422, a collision danger event field 440, an event type field 450, and an entities field 460.

Location field 422 may identify a particular location, such as, for example, an intersection, a street, a city block, and/or another type of location that may be associated with a danger of collision. Collision danger event field 440 may identify a particular collision danger event. For example, when collision detection ML model 360 detects that the likelihood of a collision occurring between a particular vehicle 110 and another vehicle 110, pedestrian 114, bicyclist 116, and/or scooter 118 is higher than a collision threshold, collision detection ML model 360 may generate a collision danger event for the particular vehicle 110. Collision danger event field 440 may include a unique identifier assigned to the collision danger event, a determined likelihood of collision for the collision danger event, and/or other types of information.

Event type field 450 may store information identifying an event type associated with the particular collision danger event. For example, collision detection ML model 360 may generate an output that identifies a particular type for collision danger events, such as, for example, a type of situation on which collision detection ML model 360 has been trained.

Entities field 460 may identify one or more entities associated with the particular collision danger event. For example, entities field 40 may identify a first vehicle 110 that may be in danger of hitting one or more other vehicles 110, pedestrians 114, bicyclists 116, and/or scooters 118 and may further identify the one or more other vehicles 110, pedestrians 114, bicyclists 116, and/or scooters 118. Entities field 460 may further identify OBD devices 112 associated with the first vehicle 110 and the one or more other vehicles 110 and addresses that may be used to reach each OBD devices 112 (e.g., an IP address, MDN, IMSI, MSISDN, IMEI, etc.). Furthermore, in some implementations, entities field 460 may further identify mobile communication devices 120 associated with the first vehicle 110, the other vehicles 110, pedestrians 114, bicyclists 116, and/or scooters 118 and addresses that may be used to reach the mobile communication devices 120 (e.g., an MDN, an IMSI, a MSISDN, an IMEI, etc.).

Although FIG. 4 shows exemplary components of collision danger DB 370, in other implementations, collision danger DB 370 may include fewer components, different components, additional components, or differently arranged components than depicted in FIG. 4.

Figure 5:
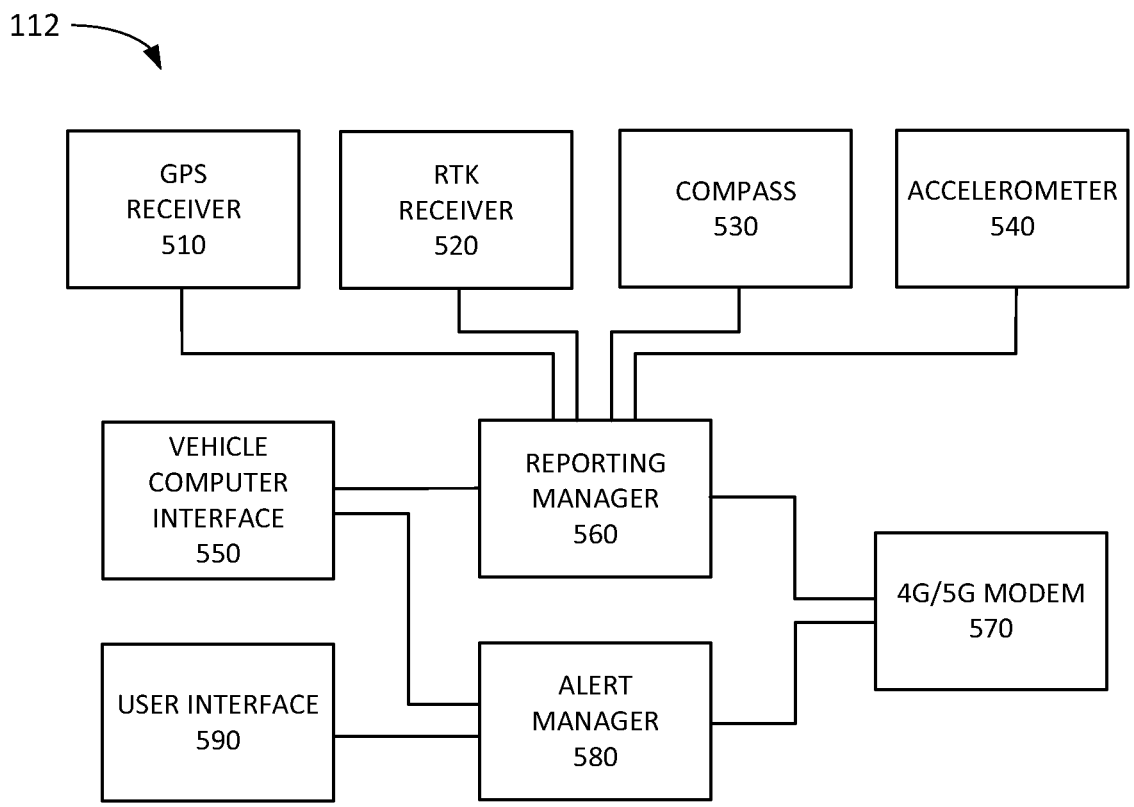
FIG. 5 illustrates exemplary components of the On-Board Diagnostics (OBD) device of FIG. 1 according to an implementation described herein.

FIG. 5 is a diagram illustrating exemplary components of OBD device 112. The components of OBD device 112 may be implemented, for example, via processor 220 executing instructions from memory 230. Alternatively, some or all of the components of OBD device 112 may be implemented via hard-wired circuitry. As shown in FIG. 5, OBD device 112 may include a GPS receiver 510, an RTK receiver 520, a compass 530, an accelerometer 540, a vehicle computer interface 550, a reporting manager 560, a 4G/5G modem 570, an alert manager 580, and a user interface 590.

GPS receiver 510 may receive GPS information for OBD device 112. RTK receiver 520 may receive RTK information for ODB device 112. Compass 530 may include an electronic compass that determines a bearing for OBD device 112. Accelerometer 540 may determine an acceleration (or deceleration) for OBD device 112. Vehicle computer interface 550 may be configured to communicate with a computer device of vehicle 110. As an example, vehicle computer interface may provide the status information for components of vehicle 110, such as the status of a turn signal, a brake or brake light, a gear or gear indicator, and/or another type of component of vehicle 110. Furthermore, in some implementations, OBD device 112 may send instructions to vehicle 110 via vehicle computer interface 550. For example, OBD device 112 may instruct vehicle 110 to brake in order to avoid a collision.

Reporting manager 560 may report information collected by OBD device 112 from GPS receiver 510, RTK receiver 520, compass 530, accelerometer 540, and/or vehicle computer interface 550 and may send the collected information to collision avoidance system 300 using 4G/5G modem 570. 4G/5G modem 570 may be configured to communicate with 5G NR base station 135 using 5G NR wireless signals. In some implementations, the reported information may be sent using DSRC messages. In other implementations, the reported information may be sent using a different type of message.

Alert manager 580 may receive collision avoidance alerts from collision avoidance system 300. In some implementations, the collision avoidance alerts may be received via DSRC messages. In other implementations, the collision avoidance alerts may be received using a different type of message. Alert manager 580 may provide the received collision avoidance alerts to user interface 590, to a mobile communication device 120 associated with a driver of vehicle 110, and/or to a computer device associated with vehicle 110 via vehicle computer interface 550.

User interface 590 may generate visual and/or auditory collision avoidance alerts. For example, user interface 590 may sound an alarm, flash lights, activate an indicator, and/or otherwise get the driver's attention to a potential collision situation so the driver can slow down or stop vehicle 110. In some implementations, user interface 590 may be coupled to mobile communication device 120 associated with the driver and mobile communication device 120 may also generate a visual and/or auditory collision avoidance alert. Furthermore, user interface 590 may be coupled to a display associated with vehicle 110, such as, for example, the dashboard of vehicle 110, and the display associated with vehicle 110 may also generate a visual and/or auditory collision avoidance alert. Additionally, in some implementations and/or situations, such as when pedestrian 114 is in danger of being hit, alert manager 580 may instruct vehicle 110 to activate the brakes and vehicle 110 may automatically slow down or stop.

Although FIG. 5 shows exemplary components of OBD device 112, in other implementations, OBD device 112 may include fewer components, different components, differently arranged components, or additional components than depicted in FIG. 5. Additionally, or alternatively, one or more components of OBD device 112 may perform functions described as being performed by one or more other components of OBD device 112.

Figure 6:
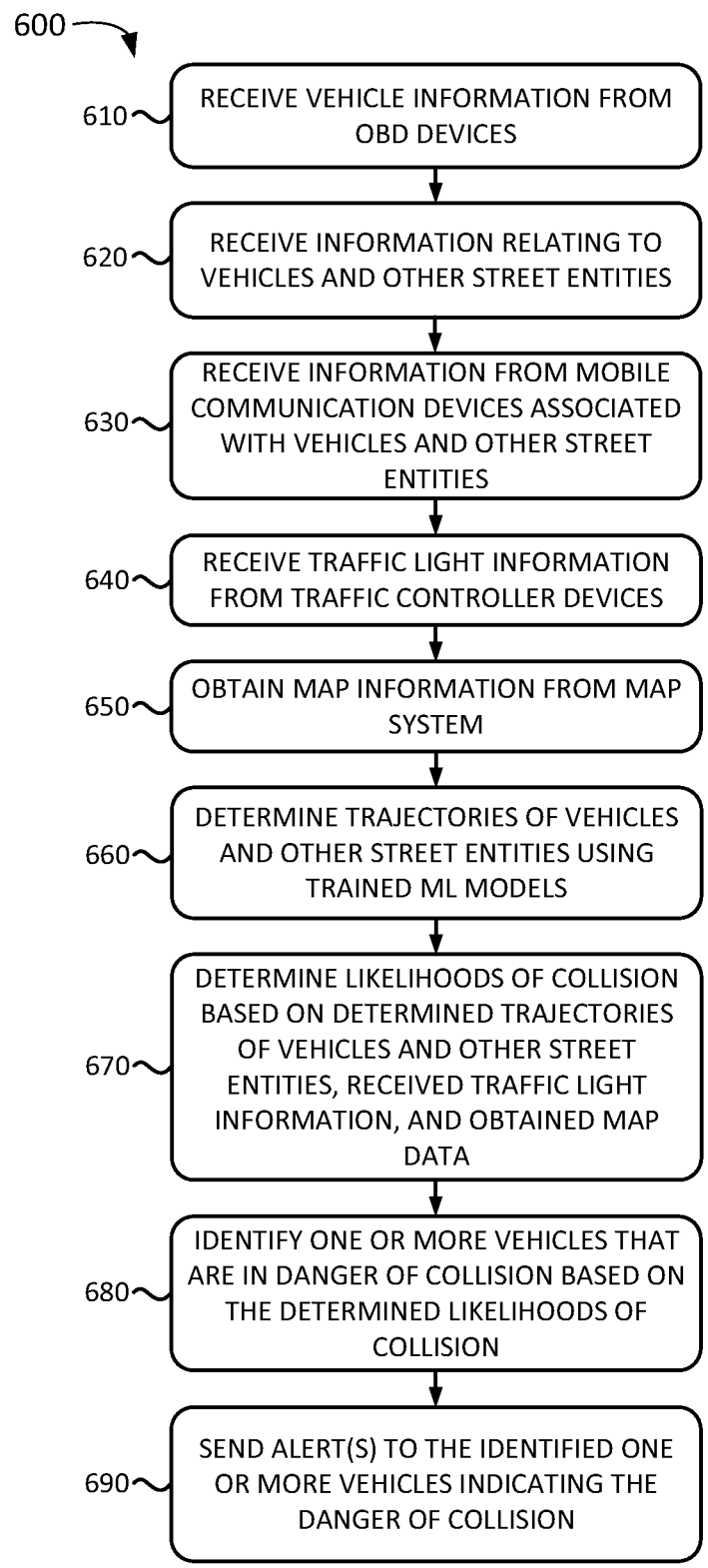
FIG. 6 illustrates a flowchart of a process for collision detection according to an implementation described herein.

FIG. 6 illustrates a flowchart 600 of a process for collision detection according to an implementation described herein. In some implementations, process 600 of FIG. 6 may be performed by MEC device 145. In other implementations, some or all of process 600 may be performed by another device or a group of devices separate from MEC device 145.

As shown in FIG. 6, process 600 may include receiving vehicle information from OBD devices (block 610). For example, collision avoidance system 300 may receive DSRC messages from OBD devices 112 in vehicles 110 in the area serviced by 5G NR base station 135. The DSRC messages may include, for example, the position, bearing, speed, and/or acceleration of vehicles 110 and/or the status of various components of vehicles 110, such as, for example, the status of turn signals, brakes, gears, etc. Collision avoidance system 300 may retrieve and input the received OBD device information into one or more trained machine learning models, such as vehicle trajectory ML model 330.

Process 600 may further include receiving information relating to vehicles and other street entities such as, for example, pedestrians, bicyclists, and/or electric scooters from cameras (block 620). For example, collision avoidance system 300 may receive information from cameras 122 in the area serviced by 5G NR base station 135. In some implementation, the information may include object detection information based on object detection performed by cameras 122 on captured images and/or videos. In other implementations, the information may include captured images and/or videos and collision avoidance system 300 may perform object recognition to identify vehicles 110, pedestrians 114, bicyclists 116, and/or scooters 118 in the received images and/or videos using one or more machine learning models. Collision avoidance system 300 may retrieve and input the received camera information into one or more trained machine learning models, such as vehicle trajectory ML model 330, pedestrian trajectory ML model 332, bicycle trajectory ML model 334, and/or scooter trajectory ML model 336.

Process 600 may further include receiving information relating to vehicles and other street entities, such as, for example, pedestrians, bicyclists, and/or electric scooters, from mobile communication devices (block 630). For example, collision avoidance system 300 may receive information, such as the position, bearing, speed, and/or acceleration of a person carrying mobile communication device 120, such as a driver or passenger in vehicle 110, pedestrian 114, bicyclist 116, or operator of scooter 118, from a collision avoidance application running on mobile communication device 120 in the area serviced by 5G NR base station 135. Collision avoidance system 300 may retrieve and input the received mobile communication device information into one or more trained machine learning models, such as vehicle trajectory ML model 330, pedestrian trajectory ML model 332, bicycle trajectory ML model 334, and/or scooter trajectory ML model 336.

Process 600 may further include receiving traffic light information from traffic light controllers (block 640) and obtaining map information from a map system (block 650). For example, collision avoidance system 300 may receive the status of traffic lights 124 in the area serviced by 5G NR base station 135 from traffic light controller 180 and may obtain a map of the area serviced by 5G NR base station 135 from map system 170.

Trajectories of vehicles and other street entities, such as, for example, pedestrians, bicyclists, and electric scooters, may be determined using trained machine learning models (block 660). For example, vehicle trajectory ML model 330 may determine the future trajectories of vehicles 110 in the area serviced by 5G NR base station 135 based on the received OBD device information, camera information, and/or mobile communication device information. Furthermore, pedestrian trajectory ML model 332 may determine the future trajectories of pedestrians 114 in the area serviced by 5G NR base station 135 based on the camera information and/or mobile communication device information. Moreover, bicycle trajectory ML model 334 may determine the future trajectories of bicyclists 116 in the area serviced by 5G NR base station 135 based on the received camera information and/or mobile communication device information. Additionally, scooter trajectory ML model 336 may determine the future trajectories of scooters 118 in the area serviced by 5G NR base station 135 based on the received camera information and/or mobile communication device information.

Likelihoods of collision may be determined based on the determined trajectories of vehicles and other street entities (e.g., pedestrians, bicyclists, and electric scooters, etc.), the received traffic light information, and the obtained map data (block 670). For example, collision detection ML model 360 may determine the likelihood of collision for particular vehicles 110 and other vehicles 110, pedestrians 114, bicyclists 116, and/or scooters 118 in the area serviced by 5G NR base station 135 based on the determined trajectories, the received traffic light information, and obtained map information. If the likelihood of collision for a vehicle 110 is higher than a collision threshold, collision detection ML model 360 may generate a collision danger indication.

Vehicles that are in danger of collision may be identified based on the determined likelihoods of collision (block 680) and alerts may be sent to the identified vehicles in danger of collision (block 690). For example, collision avoidance system 300 may identify one or more relevant vehicles 110, as well as other entities, such as pedestrians 114, bicyclists 116, and/or scooters 118, for a collision danger event and may generate an alert. The alert may then be sent to all OBD devices 112 associated with the identified relevant vehicles as a DSRC alert message. Furthermore, in some implementations, collision avoidance system 300 may also send a DSRC alert message to all mobile communication devices 120 associated with relevant entities, such as mobile communication devices 120 associated with drivers of the identified relevant vehicles 110, pedestrians 114, bicyclists 116, and/or operators of scooters 118.

Figure 7:
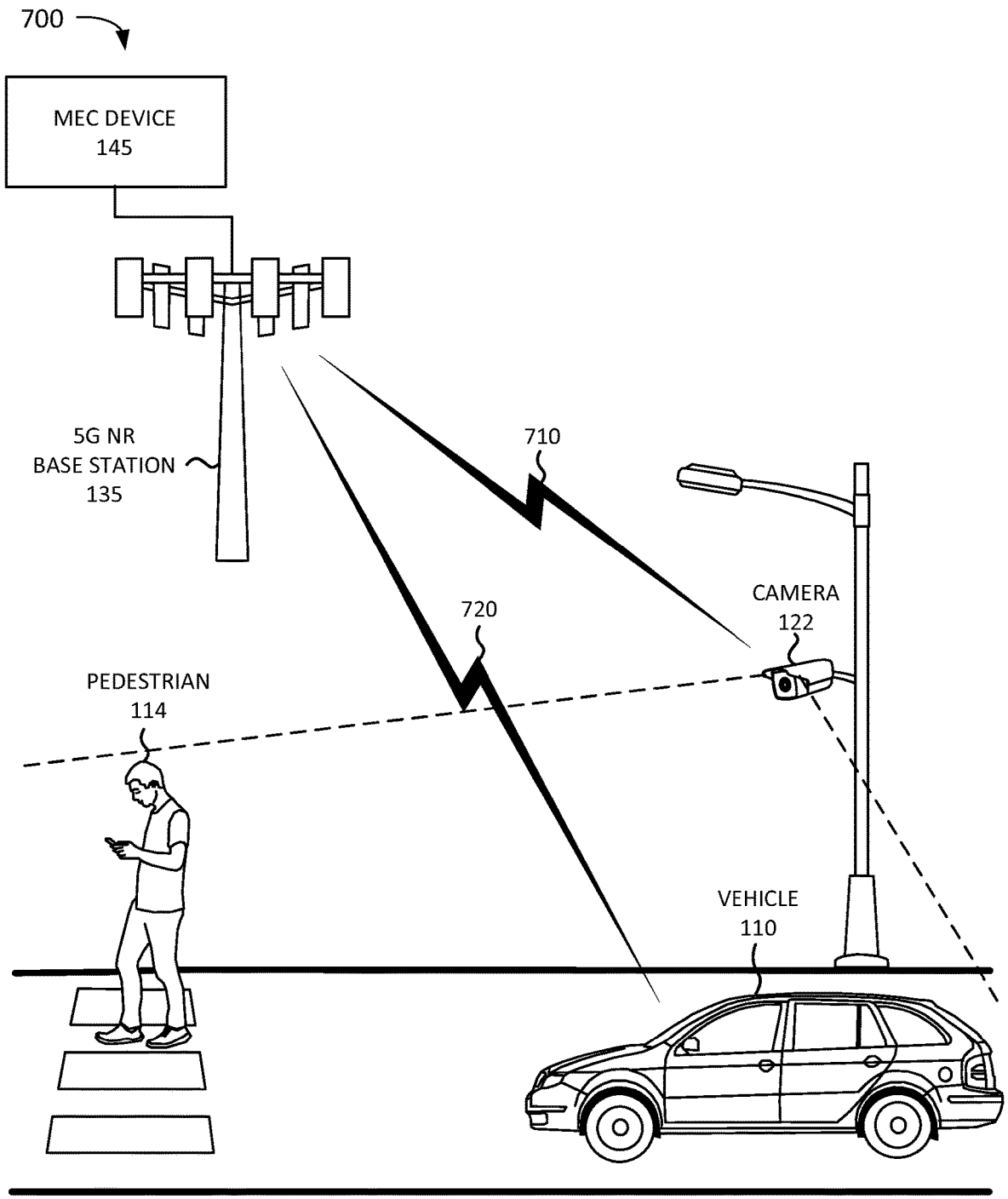
FIG. 7 illustrates a diagram of a first exemplary collision danger situation according to an implementation described herein.

FIG. 7 illustrates a diagram 700 of a first exemplary collision danger situation according to an implementation described herein. Diagram 700 illustrates a pedestrian ahead situation. Pedestrian 114 may be crossing the road ahead of moving vehicle 110. Camera 122 may capture images of the area that includes pedestrian 114 and vehicle 110 and may perform object detection to identify pedestrian 114 and vehicle 110. Camera 122 may then send the object detection information to MEC device 145 via 5G NR base station 135 using wireless signals 710. Alternatively, camera 112 may send the captured images to MEC device 145 and MEC device 145 may perform the object detection. Additionally, OBD device 112 in vehicle 110 may send a DSRC message to MEC device 145 via 5G NR base station 135 using wireless signals 720. The DSRC message may include location, speed, acceleration, and direction information for vehicle 110.

Collision avoidance system 300 running on MEC device 145 may detect a collision danger by detecting a high likelihood (e.g., higher than a threshold) of vehicle 110 hitting pedestrian 114 at the current speed and direction of vehicle 110 based on information received from camera 122 and/or OBD device 112. In response, collision avoidance system 300 may generate and send a "pedestrian ahead" DSRC alert to vehicle 110 via 5G NR base station 135 using wireless signals 720. In some implementations, OBD device 112 may receive the "pedestrian alert" DSRC alert and may generate an alert on user interface 590. In other implementations, OBD device 112 may receive the "pedestrian alert" DSRC alert and may instruct a computer device in vehicle 110 to apply automatic braking to slow down and stop vehicle 110. In yet other implementations, OBD device 112 may be connected (e.g., via a short-range wireless communication protocol such as Bluetooth, etc.) to mobile communication device 120 associated with the driver of vehicle 110 and may forward the "pedestrian alert" DSRC alert to mobile communication device 120. Mobile communication device 120 may include a collision avoidance application that generates an alert to the driver based on the received "pedestrian alert" DSRC alert. In response, the driver of vehicle 110 may slow down and avoid hitting pedestrian 114.

Figure 8:
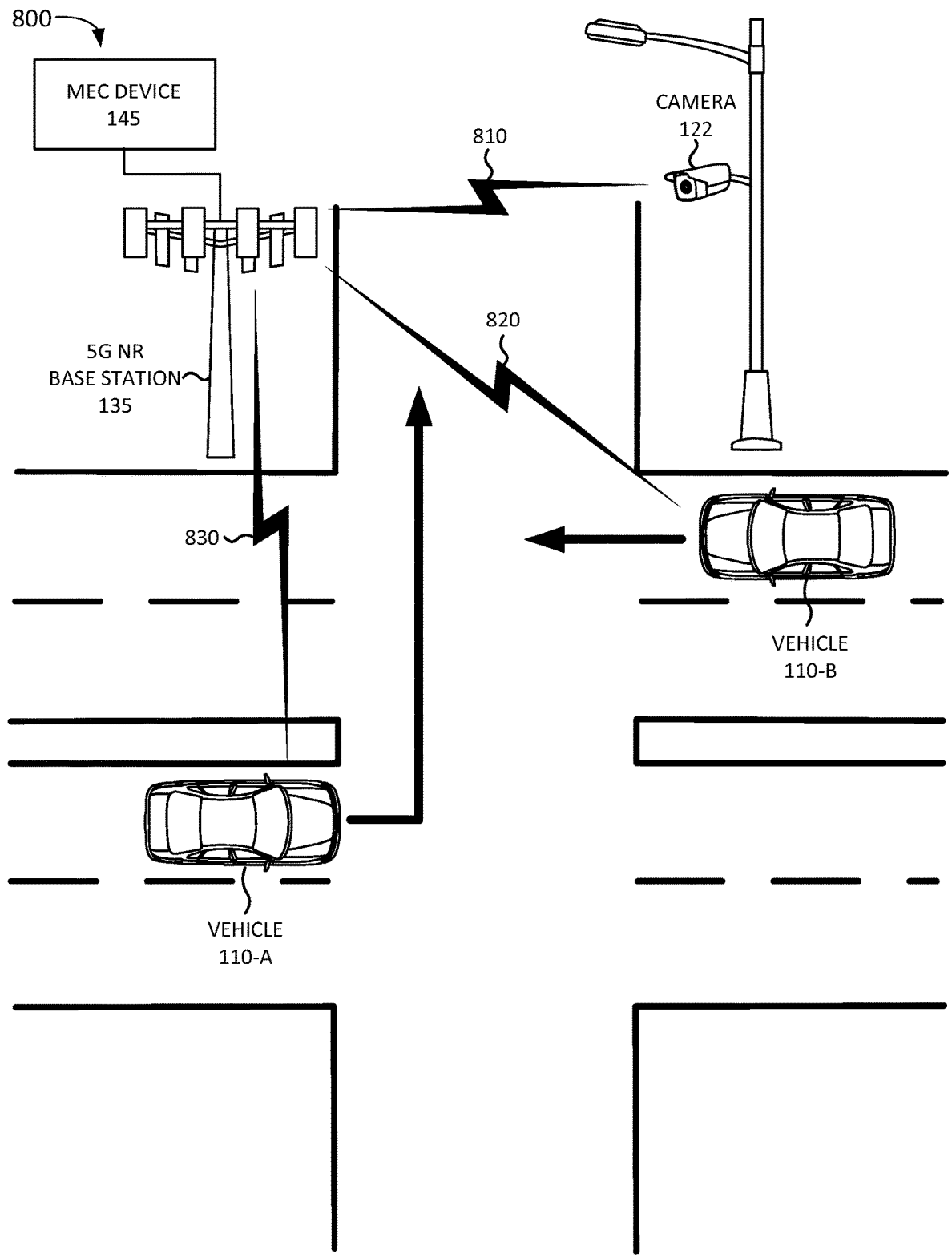
FIG. 8 illustrates a diagram of a second exemplary collision danger situation according to an implementation described herein.

FIG. 8 illustrates a diagram 800 of a second exemplary collision danger situation according to an implementation described herein. Diagram 800 illustrates a left turn assist situation. Vehicle 110-A may be getting ready to make a left turn across opposing traffic while vehicle 110-B is driving in the opposite direction. Camera 122 may capture images of the area that includes vehicles 110-A and 110-B and may perform object detection to identify vehicles 110-A and 110-B. Camera 122 may then send the object detection information to MEC device 145 via 5G NR base station 135 using wireless signals 810. Alternatively, camera 112 may send the captured images to MEC device 145 and MEC device 145 may perform the object detection. Additionally, OBD device 112 in vehicle 110-A may send a DSRC message to MEC device 145 via 5G NR base station 135 using wireless signals 820 and OBD device 112 in vehicle 110-B may send a DSRC message to MEC device 145 via 5G NR base station 135 using wireless signals 830. The DSRC messages may include location, speed, acceleration, and direction information for vehicles 110-A and 110-B.

Collision avoidance system 300 running on MEC device 145 may detect a collision danger by detecting a high likelihood (e.g., higher than a threshold) of vehicle 110-B hitting vehicle 110-A during the left turn being made by vehicle 110-A. Collision avoidance system 300 may detect that vehicle 110-A is about to turn left based on a "left turn signal on" indication included in the DSRC message sent by vehicle 110-A, based on the deceleration of vehicle 110-A detected by accelerometer 540 in OBD device 112 of vehicle 110-A and indicated in the DSRC message, and/or based on other information included in the DSRC message. Additionally, or alternatively, collision avoidance system 300 may detect that vehicle 110-A is about to turn left based on changes in the position of vehicle 110-A over time detected by camera 122.

Collision avoidance system 300 may generate and send a "left turn assist" DSRC alert to vehicle 110-A via 5G NR base station 135 using wireless signals 830. In some implementations, OBD device 112 may receive the "left turn assist" DSRC alert and may generate an alert on user interface 590. In other implementations, OBD device 112 may be connected (e.g., via a short-range wireless communication protocol such as Bluetooth, etc.) to mobile communication device 120 associated with the driver of vehicle 110 and may forward the "left turn assist" DSRC alert to mobile communication device 120. Mobile communication device 120 may include a collision avoidance application that generates an alert to the driver based on the received "left turn assist" DSRC alert. In response, the driver of vehicle 110 may slow down and delay making the left turn.

Figure 9:
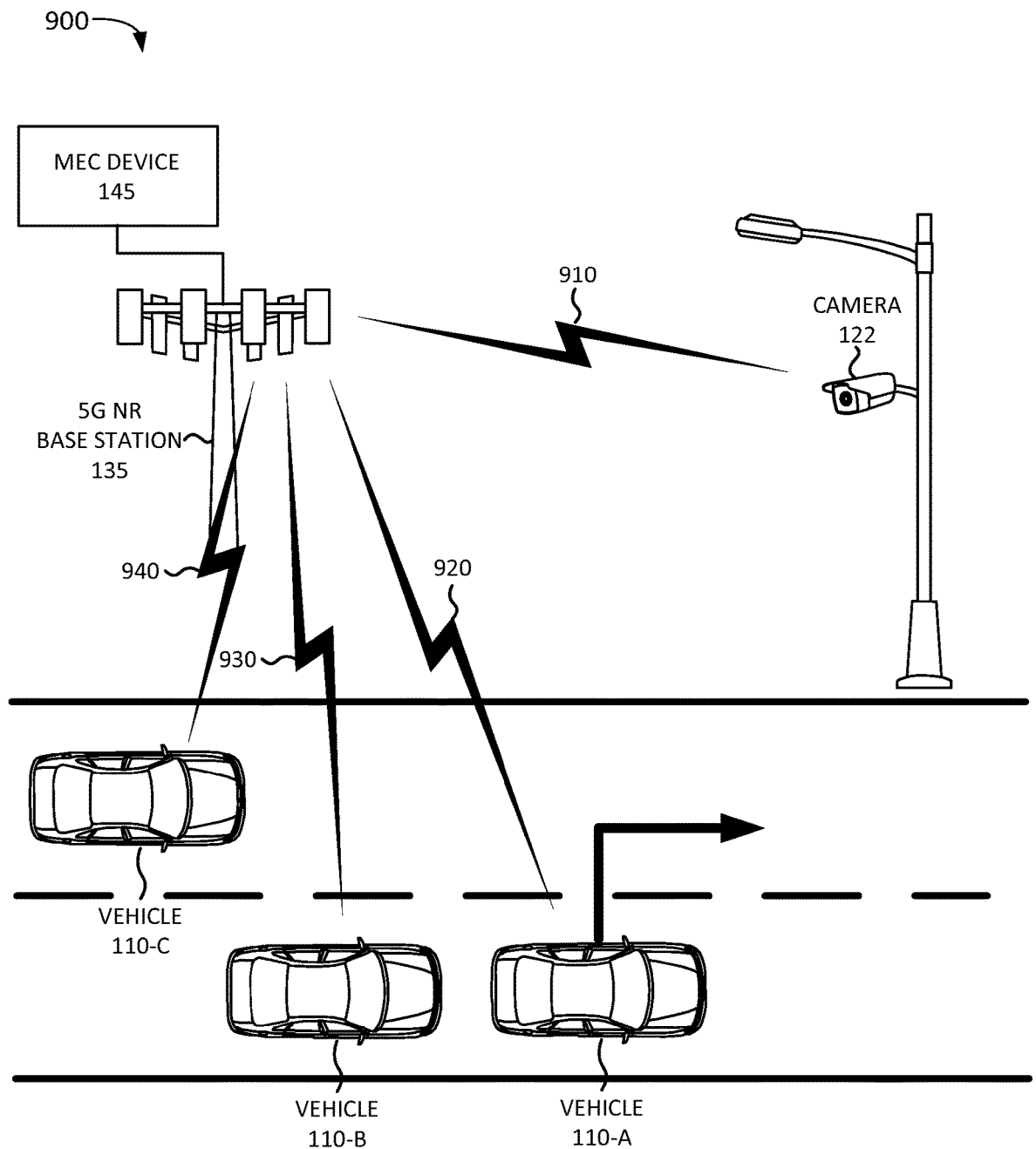
FIG. 9 illustrates a diagram of a third exemplary collision danger situation according to an implementation described herein.

FIG. 9 illustrates a diagram 900 of a third exemplary collision danger situation according to an implementation described herein. Diagram 900 illustrates a lane change warning situation. Vehicle 110-A may be getting ready to make a lane change, while being in front of vehicle 110-B and with vehicle 110-C driving in the other lane. Thus, vehicle 110-B may obscure the field of view of the driver of vehicle 110-A and the driver of vehicle 110-A may not see vehicle 110-C. In other words, vehicle 110-C may be in the blind spot of vehicle 110-A.

Camera 122 may capture images of the area that includes vehicles 110-A, 110-B, and 110-C, and may perform object detection to identify vehicles 110-A, 110-B, and 110-C. Camera 122 may then send the object detection information to MEC device 145 via 5G NR base station 135 using wireless signals 910. Alternatively, camera 112 may send the captured images to MEC device 145 and MEC device 145 may perform the object detection. Additionally, OBD device 112 in vehicle 110-A may send a DSRC message to MEC device 145 via 5G NR base station 135 using wireless signals 920, OBD device 112 in vehicle 110-B may send a DSRC message to MEC device 145 via 5G NR base station 135 using wireless signals 930, and OBD device 112 in vehicle 110-C may send a DSRC message to MEC device 145 via 5G NR base station 135 using wireless signals 940. The DSRC messages may include location, speed, acceleration, and direction information for vehicles 110-A, 110-B, and 110-C.

Collision avoidance system 300 running on MEC device 145 may detect a collision danger by detecting a high likelihood (e.g., higher than a threshold) of vehicle 110-C hitting vehicle 110-A during the lane change being made by vehicle 110-A. Collision avoidance system 300 may detect that vehicle 110-A is about to make the lane change based on a "left turn signal on" indication included in the DSRC message sent by vehicle 110-A, based on an acceleration and/or speed change of vehicle 110-A detected by OBD device 112 of vehicle 110-A and indicated in the DSRC message, and/or based on other information included in the DSRC message. Additionally, or alternatively, collision avoidance system 300 may detect that vehicle 110-A is in the process of changing lanes based on changes in the position of vehicle 110-A over time detected by camera 122.

Collision avoidance system 300 may generate and send a "lane change warning" DSRC alert to vehicle 110-A via 5G NR base station 135 using wireless signals 930. In some implementations, OBD device 112 may receive the "lane change warning" DSRC alert and may generate an alert on user interface 590. In other implementations, OBD device 112 may be connected (e.g., via a short-range wireless communication protocol such as Bluetooth, etc.) to mobile communication device 120 associated with the driver of vehicle 110 and may forward the "lane change warning" DSRC alert to mobile communication device 120. Mobile communication device 120 may include a collision avoidance application that generates an alert to the driver based on the received "lane change warning" DSRC alert. In response, the driver of vehicle 110 may slow down and delay making the lane change.

Figure 10:
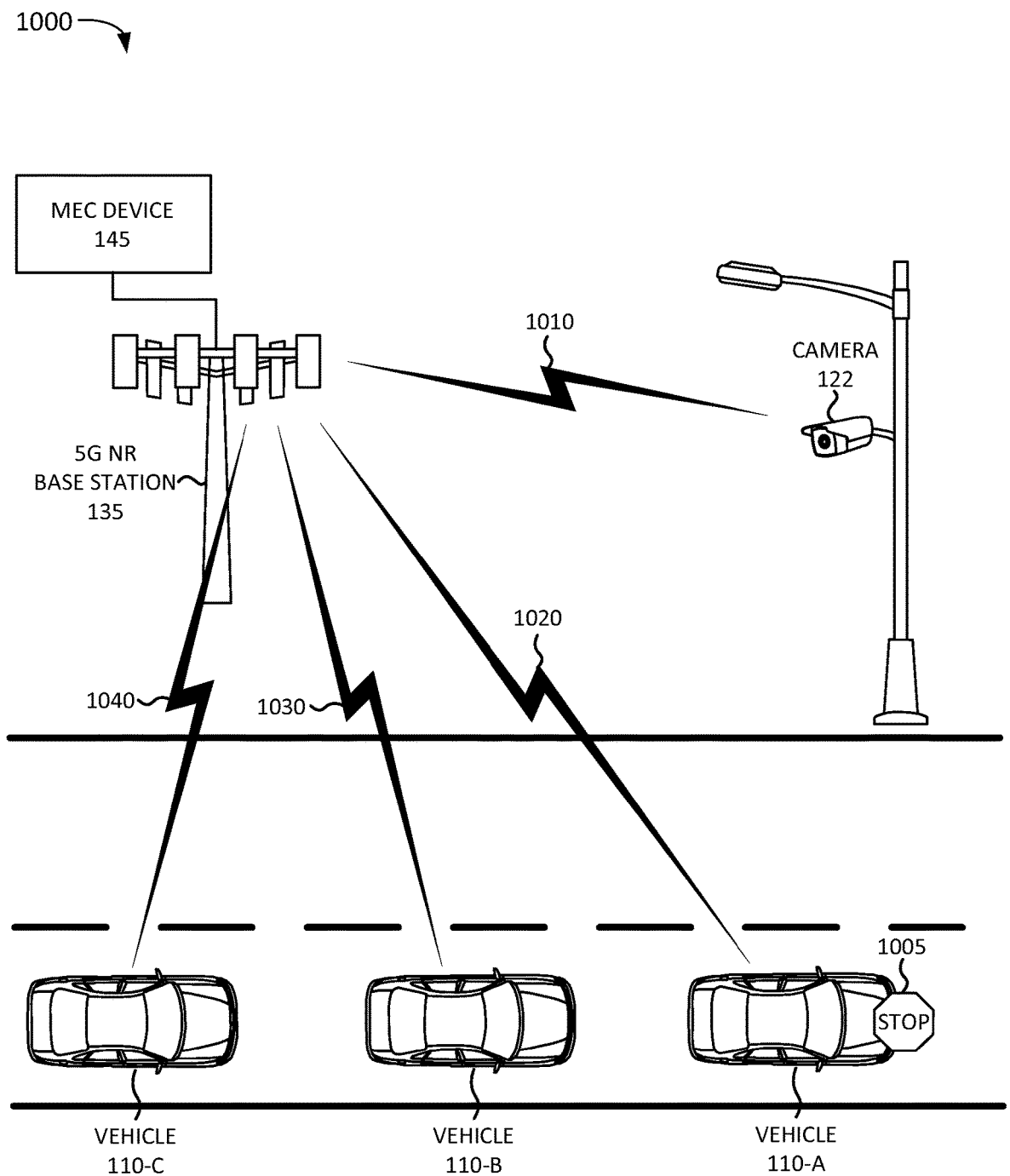
FIG. 10 illustrates a diagram of a fourth exemplary collision danger situation according to an implementation described herein.

FIG. 10 illustrates a diagram 1000 of a fourth exemplary collision danger situation according to an implementation described herein. Diagram 1000 illustrates a braking ahead situation, also sometimes referred to as a "see-through"

situation, because it enables a first vehicle to see through to the actions of a second vehicle that is ahead and not visible to the first vehicle. Vehicles 110-A, 110-B, and 110-C may be driving in the same line when vehicle 100-A suddenly breaks (item 1005). Camera 122 may capture images of the area that includes vehicles 110-A, 110-B, and 110-C, and may perform object detection to identify vehicles 110-A, 110-B, and 110-C. Camera 122 may then send the object detection information to MEC device 145 via 5G NR base station 135 using wireless signals 1010. Alternatively, camera 112 may send the captured images to MEC device 145 and MEC device 145 may perform the object detection. Additionally, OBD device 112 in vehicle 110-A may send a DSRC message to MEC device 145 via 5G NR base station 135 using wireless signals 1020, OBD device 112 in vehicle 110-B may send a DSRC message to MEC device 145 via 5G NR base station 135 using wireless signals 1030, and OBD device 112 in vehicle 110-C may send a DSRC message to MEC device 145 via 5G NR base station 135 using wireless signals 1040. The DSRC messages may include location, speed, acceleration, and direction information for vehicles 110-A, 110-B, and 110-C.

Collision avoidance system 300 running on MEC device 145 may detect a collision danger by detecting a high likelihood (e.g., higher than a threshold) of vehicle 110-B hitting vehicle 110-A and vehicle 110-C hitting vehicle 110-B when vehicle 110-A decelerates rapidly as a result of the sudden braking action. Collision avoidance system 300 may detect that vehicle 110-A is braking based on an acceleration and/or speed change of vehicle 110-A detected by OBD device 112 of vehicle 110-A and indicated in the DSRC message, based on a braking indication received by OBD device 112 of vehicle 110-A received via vehicle computer interface 550 and included in the DSRC message, and/or based on other information included in the DSRC message. Additionally, or alternatively, collision avoidance system 300 may detect that vehicle 110-A is braking based on changes in the position of vehicle 110-A over time detected by camera 122.

Collision avoidance system 300 may generate and send an "emergency braking warning" DSRC alert to vehicles 110-B and 110-C via 5G NR base station 135 using wireless signals 1030 and 1040. In some implementations, OBD device 112 may receive the "emergency braking warning" DSRC alert and may generate an alert on user interface 590. In other implementations, the OBD devices 112 of vehicles 110-B and 110-C may receive the "emergency braking warning" DSRC alert and may instruct computer devices in vehicles 110-B and 110-C to apply automatic braking to slow down and stop vehicles 110-B and 100-C. In yet other implementations, OBD devices 112 of vehicles 110-B and/or 110-C may be connected (e.g., via a short-range wireless communication protocol such as Bluetooth, etc.) to mobile communication devices 120 associated with the drivers of vehicles 110-B and 110-C, respectively, and may forward the "emergency braking warning" DSRC alert to the mobile communication device 120. Mobile communication devices 120 may include a collision avoidance application that generates an alert to the driver based on the received "lane change warning" DSRC alert. In response, the drivers of vehicles 110-B and 110-C may brake.

Figure 11:
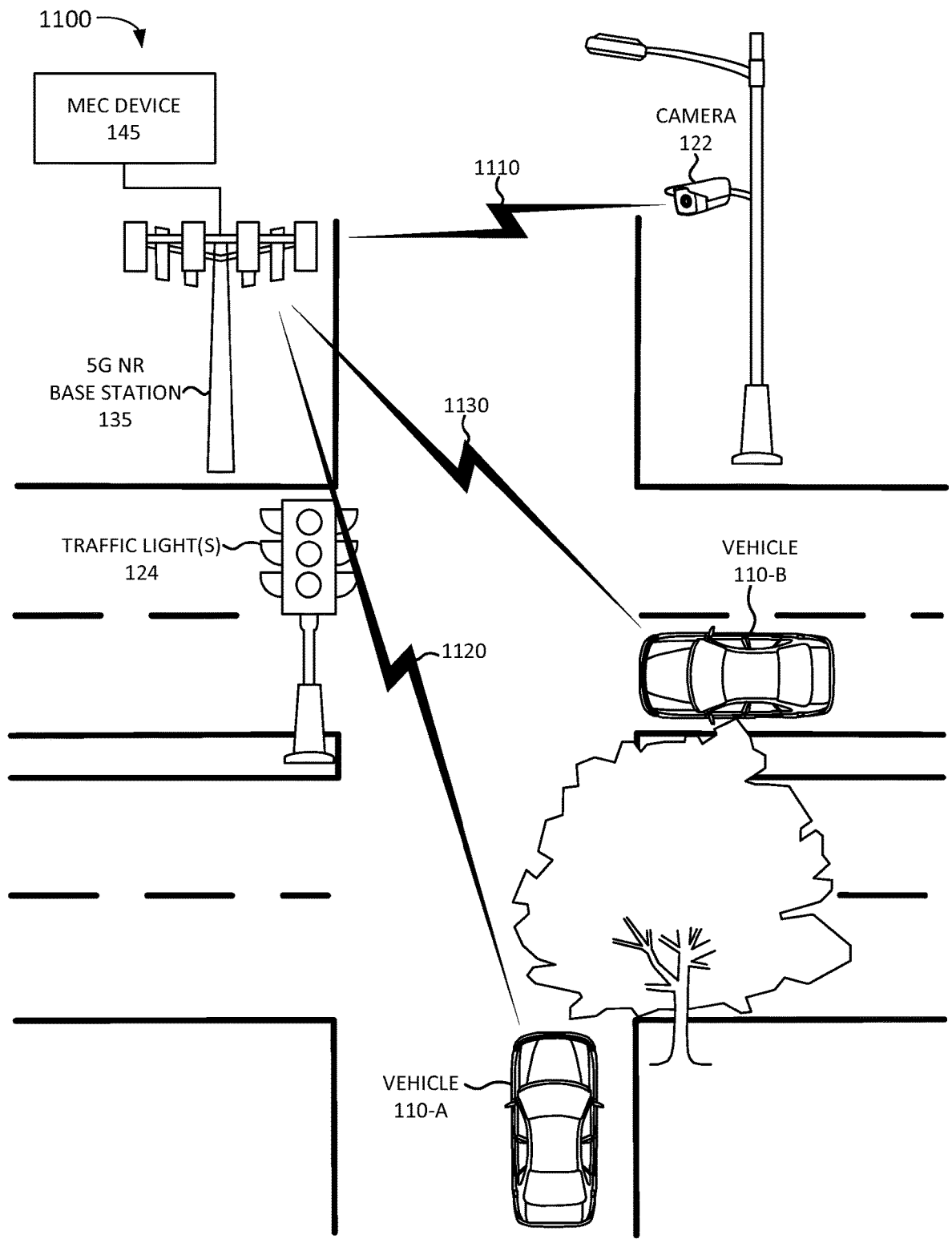
FIG. 11 illustrates a diagram of a fifth exemplary collision danger situation according to an implementation described herein.

FIG. 11 illustrates a diagram 1100 of a fifth exemplary collision danger situation according to an implementation described herein. Diagram 1100 illustrates an intersection assist situation in which a vehicle is provided with assistance when crossing an intersection that limits the driver's field of view. Vehicle 110-A may be crossing an intersection with traffic light 124. Vehicle 110-B may be crossing the intersection at the same time and may be running a red light displayed by traffic light 124.

Camera 122 may capture images of the area that includes vehicles 110-A and 110-B and may perform object detection to identify vehicles 110-A and 110-B. Camera 122 may then send the object detection information to MEC device 145 via 5G NR base station 135 using wireless signals 1110. Alternatively, camera 112 may send the captured images to MEC device 145 and MEC device 145 may perform the object detection. Additionally, OBD device 112 in vehicle 110-A may send a DSRC message to MEC device 145 via 5G NR base station 135 using wireless signals 1120 and OBD device 112 in vehicle 110-B may send a DSRC message to MEC device 145 via 5G NR base station 135 using wireless signals 1130. The DSRC messages may include location, speed, acceleration, and direction information for vehicles 110-A and 110-B. Furthermore, MEC device 145 may obtain the traffic light status of traffic light 124 from traffic light controller 180.

Collision avoidance system 300 running on MEC device 145 may detect a collision danger by detecting a high likelihood (e.g., higher than a threshold) of vehicle 110-A hitting vehicle 110-B when vehicle 110-B runs the red light displayed by traffic light 124. Collision avoidance system 300 may detect that vehicle 110-B will run the red light based on the speed of vehicle 110-B and the status of traffic light 124. Collision avoidance system 300 may further determine that vehicle 110-A may hit vehicle 110-B based on the speed and direction of vehicle 110-A. Additionally, or alternatively, collision avoidance system 300 may detect that vehicle 110-A may hit vehicle 110-B based on information received from camera 122.

Collision avoidance system 300 may generate and send an "intersection assist" DSRC alert to vehicles 110-A via 5G NR base station 135 using wireless signals 1020. In some implementations, OBD device 112 may receive the "intersection assist" DSRC alert and may generate an alert on user interface 590. In other implementations, OBD device 112 of vehicle 110-A may be connected (e.g., via a short-range wireless communication protocol such as Bluetooth, etc.) to mobile communication device 120 associated with the driver of vehicle 110-A and may forward the "intersection assist" DSRC alert to the mobile communication device 120. Mobile communication device 120 may include a collision avoidance application that generates an alert to the driver based on the received "intersection assist" DSRC alert. In response, the driver of vehicle 110-A may slow down before entering the intersection.

Figure 12:
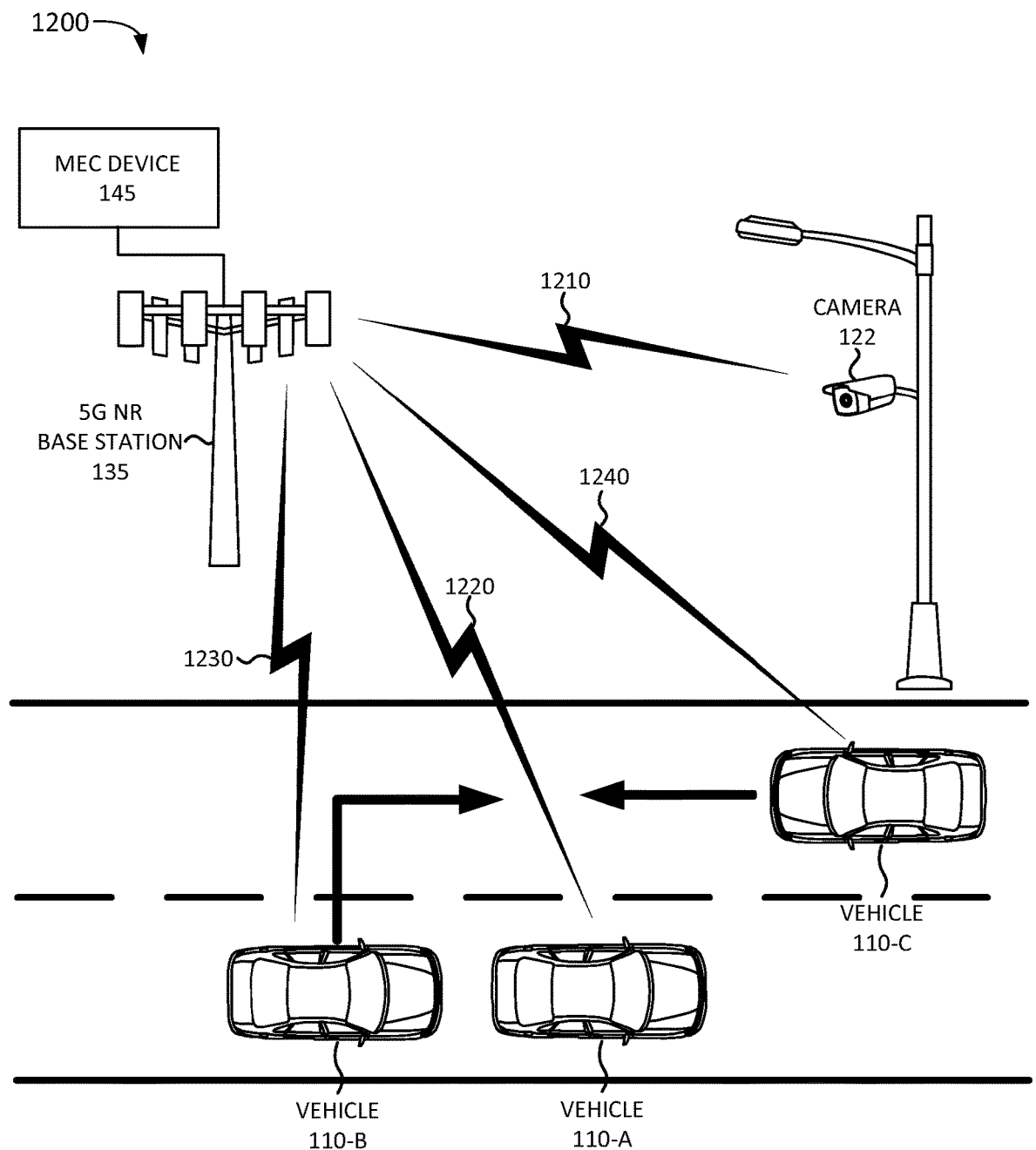
FIG. 12 illustrates a diagram of a sixth exemplary collision danger situation according to an implementation described herein.

FIG. 12 illustrates a diagram 1200 of a sixth exemplary collision danger situation according to an implementation described herein. Diagram 1200 illustrates a "do not pass" situation in which a vehicle is in danger of hitting a vehicle going in the opposite direction when passing another vehicle. Vehicles 110-A and 110-B may be going in the same direction on a single lane road where passing is allowed, while vehicle 110-C is driving in the opposite direction. Vehicle 110-A may attempt to pass vehicle 110-B and the driver may not see vehicle 110-C because vehicle 110-C may be obscured by vehicle 110-B.

Camera 122 may capture images of the area that includes vehicles 110-A, 110-B, and 110-C, and may perform object detection to identify vehicles 110-A, 110-B, and 110-C. Camera 122 may then send the object detection information to MEC device 145 via 5G NR base station 135 using wireless signals 1210. Alternatively, camera 112 may send the captured images to MEC device 145 and MEC device 145 may perform the object detection. Additionally, OBD device 112 in vehicle 110-A may send a DSRC message to MEC device 145 via 5G NR base station 135 using wireless signals 1220, OBD device 112 in vehicle 110-B may send a DSRC message to MEC device 145 via 5G NR base station 135 using wireless signals 1230, and OBD device 112 in vehicle 110-C may send a DSRC message to MEC device 145 via 5G NR base station 135 using wireless signals 1240. The DSRC messages may include location, speed, acceleration, and direction information for vehicles 110-A, 110-B, and 110-C.

Collision avoidance system 300 running on MEC device 145 may detect a collision danger by detecting a high likelihood (e.g., higher than a threshold) of vehicle 110-B hitting vehicle 110-C when vehicle 110-B attempts to pass vehicle 110-A. Collision avoidance system 300 may detect that vehicle 110-B is attempting to pass vehicle 110-A based on the acceleration of vehicle 110-B, based on vehicle 110-B activating a turn signal, and/or based on other information included in the DSRC message. Additionally, or alternatively, collision avoidance system 300 may detect that vehicle 110-B is attempting to change lanes based on changes in the position of vehicle 110-B over time detected by camera 122.

Collision avoidance system 300 may generate and send a "do not pass warning" DSRC alert to vehicle 110-B via 5G NR base station 135 using wireless signals 1230. In some implementations, OBD device 112 may receive the "do not pass" DSRC alert and may generate an alert on user interface 590. In other implementations, OBD device 112 of vehicle 110-B may be connected (e.g., via a short-range wireless communication protocol such as Bluetooth, etc.) to mobile communication device 120 associated with the driver of vehicle 110-B and may forward the "do not pass" DSRC alert to the mobile communication device 120. Mobile communication device 120 may include a collision avoidance application that generates an alert to the driver based on the received "do not pass" DSRC alert. In response, the driver of vehicle 110-B may slow down and delay the attempt to pass vehicle 110-A.

Figure 13:
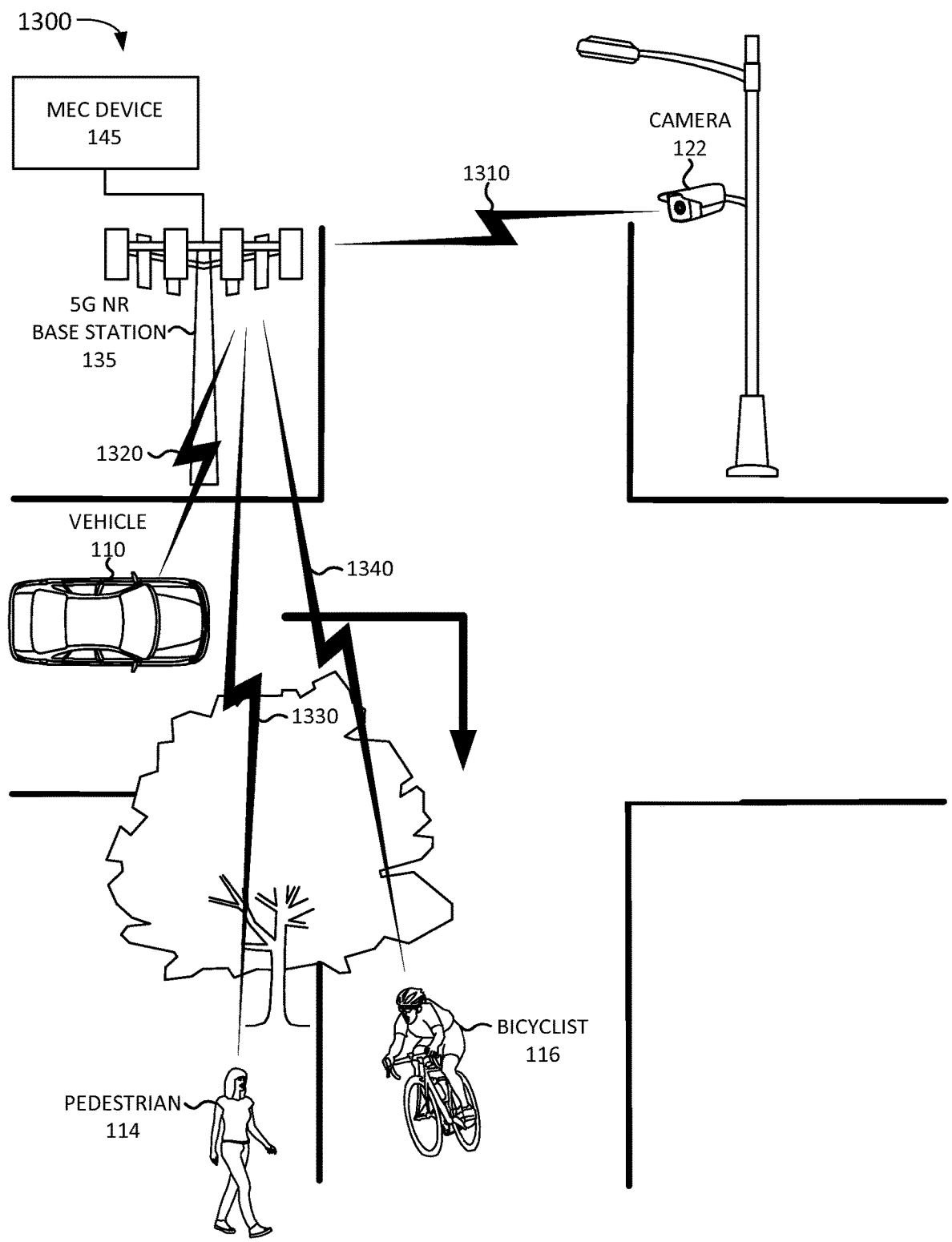
FIG. 13 illustrates a diagram of a seventh exemplary collision danger situation according to an implementation described herein.

FIG. 13 illustrates a diagram 1300 of a seventh exemplary collision danger situation according to an implementation described herein. Diagram 1300 illustrates a blind intersection situation. Vehicle 110 may be entering a blind intersection where the visibility to the right is obscured by a tree. Vehicle 110 may be getting ready to make a right turn where pedestrian 114 is getting ready to cross the street and where bicyclist 116 is on the street.

Camera 122 may capture images of the area that includes vehicle 110-A, pedestrian 114, and bicyclist 116, and may perform object detection to identify vehicle 110-A, pedestrian 114, and bicyclist 116. Camera 122 may then send the object detection information to MEC device 145 via 5G NR base station 135 using wireless signals 1310. Alternatively, camera 112 may send the captured images to MEC device 145 and MEC device 145 may perform the object detection. Additionally, OBD device 112 in vehicle 110 may send a DSRC message to MEC device 145 via 5G NR base station 135 using wireless signals 1320. Furthermore, pedestrian 114 and/or bicyclist 116 may each carry a mobile communication device 120 that includes a collision avoidance application that reports location, speed, and direction information in DSRC messages to collision avoidance system 300 via 5G NR base station 135 using wireless signals 1330 and 1340.

Collision avoidance system 300 running on MEC device 145 may detect a collision danger by detecting a high likelihood (e.g., higher than a threshold) of vehicle hitting pedestrian 114 and/or bicyclist 116 when vehicle 110 makes the right turn. Collision avoidance system 300 may detect that vehicle 110 is about to turn right based on a "right turn signal on" indication included in the DSRC message sent by vehicle 110, based on the deceleration of vehicle 110 detected by accelerometer 540 in OBD device 112 of vehicle 110 and indicated in the DSRC message, and/or based on other information included in the DSRC message. Additionally, or alternatively, collision avoidance system 300 may detect that vehicle 110 is about to turn right based on changes in the position of vehicle 110 over time detected by camera 122.

Collision avoidance system 300 may generate and send a "blind intersection warning" DSRC alert to vehicle 110 via 5G NR base station 135 using wireless signals 1320. In some implementations, OBD device 112 may receive the "blind intersection warning" DSRC alert and may generate an alert on user interface 590. In other implementations, OBD device 112 of vehicle 110 may be connected (e.g., via a short-range wireless communication protocol such as Bluetooth, etc.) to mobile communication device 120 associated with the driver of vehicles 110 and may forward the "blind intersection warning" DSRC alert to the mobile communication device 120, which may generate an alert to the driver based on the received "blind intersection warning" DSRC alert. In response, the driver of vehicle 110 may slow down and/or delay making the right turn. Furthermore, collision avoidance system 300 may generate and send a "blind intersection warning" DSRC alert to collision avoidance applications running on mobile communication devices 120 of pedestrian 114 and bicyclist 116. Pedestrian 114 and/or bicyclist 116 may, in response, look out for vehicle 110.

Figure 14:
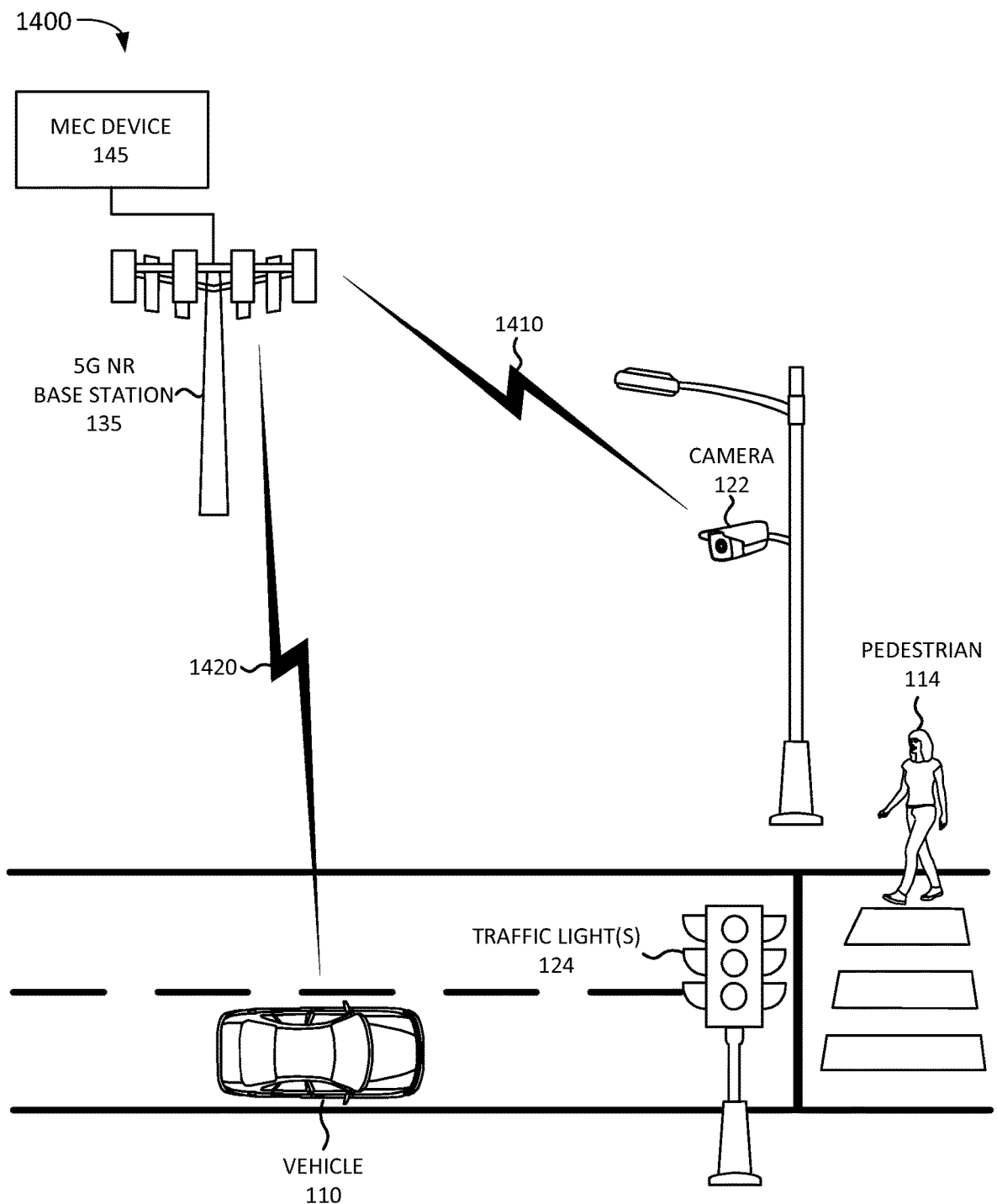
FIG. 14 illustrates a diagram of an eighth exemplary collision danger situation according to an implementation described herein.

FIG. 14 illustrates a diagram 1400 of an eighth exemplary collision danger situation according to an implementation described herein. Diagram 1400 illustrates an extended green traffic light situation in which a traffic light is delayed to avoid a potential collision. Pedestrian 114 may be waiting to cross the street while vehicle 110 is approaching traffic light 124. Camera 122 may capture images of the area that includes vehicle 110 and pedestrian 114 and may perform object detection to identify vehicle 110 and pedestrian 114. Camera 122 may then send the object detection information to MEC device 145 via 5G NR base station 135 using wireless signals 1410. Alternatively, camera 112 may send the captured images to MEC device 145 and MEC device 145 may perform the object detection. Additionally, OBD device 112 in vehicle 110 may send a DSRC message to MEC device 145 via 5G NR base station 135 using wireless signals 1420. The DSRC message may include location, speed, acceleration, and direction information for vehicle 110. Furthermore, MEC device 145 may obtain the traffic light status of traffic light 124 from traffic light controller 180.

Collision avoidance system 300 running on MEC device 145 may detect a collision danger by detecting a high likelihood (e.g., higher than a threshold) of vehicle 110 crossing the crosswalk after traffic light 124 changes from green to red based on the speed of vehicle 110 and the status of traffic light 124. Pedestrian 114 may start crossing the street after traffic light 124 turns red, leading to the possibility of vehicle 110 hitting pedestrian 114. Additionally, or alternatively, collision avoidance system 300 may detect that vehicle 110 may cross a red light based on information received from camera 122.

Collision avoidance system 300 may generate and send a "pedestrian ahead" DSRC alert to vehicle 110 via 5G NR base station 135 using wireless signals 1420. In response, the driver of vehicle 110 may slow down and stop before entering the intersection. Additionally, collision avoidance system 300 may send an "extended green" instruction to traffic light controller 180 to extend the time that traffic light 124 is green. This may cause vehicle 110 to cross the crosswalk while traffic light 124 is green and may delay pedestrian 114 from starting to cross the street, reducing the possibility that vehicle 110 may hit pedestrian 114.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device, information relating to a plurality of vehicles in an area;
   using, by the computer device, one or more trained machine learning models to determine a likelihood of collision by one or more of the plurality of vehicles, wherein the one or more trained machine learning models are trained using a plurality of simulated collision danger situations, and wherein the one or more trained machine learning models include a machine learning model trained to predict future trajectories for particular ones of the plurality of vehicles, wherein the machine learning model is configured to use as input a first set of input elements that represent telemetry measurements for the particular ones of the plurality of vehicles and a second set of input elements that include changes in location for the particular ones of the plurality of vehicles;
   identifying, by the computer device, one or more vehicles, of the plurality of vehicles, based on the determined likelihood of collision; and
   sending, by the computer device, an alert indicating a danger of collision to at least one of the identified one or more vehicles.

2. The method of claim 1, wherein receiving the information relating to the plurality of vehicles in the area includes:
   receiving information from a plurality of on-board diagnostics (OBD) devices associated with the plurality of vehicles.

3. The method of claim 2, wherein the information from the plurality of OBD devices includes, for a particular vehicle of the plurality of vehicles, at least one of:
   a Real-Time Kinematic (RTK) position for the particular vehicle;
   a heading for the particular vehicle;
   a speed for the particular vehicle;
   an acceleration for the particular vehicle;
   a type of vehicle for the particular vehicle; or
   a vehicle component status for the particular vehicle.

4. The method of claim 1, wherein receiving the information relating to the plurality of vehicles in the area includes:
   receiving object detection information from a plurality of cameras located in the area, wherein the object detection information includes information identifying a location of an object and information identifying a type of object, wherein the type of object comprises at least one of a vehicle, a pedestrian, or a bicycle.

5. The method of claim 1, wherein receiving the information relating to the plurality of vehicles in the area includes:
receiving pedestrian location information from mobile communication devices associated with pedestrians in the area.

6. The method of claim 1, further comprising:
obtaining traffic light information from a plurality of traffic light controllers located in the area,
wherein using the one or more trained machine learning models to determine the likelihood of collision by the one or more of the plurality of vehicles includes inputting the obtained traffic light information into the one or more machine learning models.

7. The method of claim 1, further comprising:
obtaining at least one of pedestrian information for a plurality of pedestrians in the area, bicycle information for a plurality of bicycles in the area, or electric scooter information for a plurality of electric scooters in the area,
wherein using the one or more trained machine learning models to determine the likelihood of collision by one or more of the plurality of vehicles includes inputting the obtained at least one of the pedestrian information, the bicycle information, or the electric scooter information into the one or more trained machine learning models.

8. The method of claim 1, wherein the one or more trained machine learning models further include:
a second machine learning model trained to determine the likelihood of collision based on the predicted future trajectories for the particular ones of the plurality of vehicles; and
a third machine learning model trained to predict future trajectories for a plurality of pedestrians in the area,
wherein the second machine learning model is further trained to determine the likelihood of collision based on the predicted future trajectories for the plurality of pedestrians in the area.

9. The method of claim 8, wherein the machine learning model and the second machine learning model are trained using fields of view for vehicles in particular collision danger situations to determine a likelihood a driver of a first vehicle will notice a second vehicle in a collision danger situation.

10. The method of claim 1, wherein the plurality of simulated collision danger situations includes one or more of:
a pedestrian ahead situation,
a left turn situation,
a lane change situation,
an intersection movement situation,
an emergency braking ahead situation,
a do not pass situation, or
a blind intersection situation.

11. The method of claim 1, wherein the computer device is located in a Multi-Access Edge Computing (MEC) network associated with a base station, wherein the information relating to the plurality of vehicles is received via Fifth Generation (5G) New Radio (NR) wireless signals by the base station, and wherein the alert is transmitted by the base station using 5G NR wireless signals.

12. A device comprising:
a memory storing instructions; and
a processor configured to execute the instructions to:
receive information relating to a plurality of vehicles in an area;
use one or more trained machine learning models to determine a likelihood of collision by one or more of the plurality of vehicles, wherein the one or more trained machine learning models are trained using a plurality of simulated collision danger situations, and wherein the one or more trained machine learning models include a machine learning model trained to predict future trajectories for particular ones of the plurality of vehicles, wherein the machine learning model is configured to use as input a first set of input elements that represent telemetry measurements for the particular ones of the plurality of vehicles and a second set of input elements that include changes in location for the particular ones of the plurality of vehicles;
identify one or more vehicles of the plurality of vehicles that are in danger of collision based on the determined likelihood of collision; and
send an alert to at least one of the identified one or more vehicles.

13. The device of claim 12, wherein, when receiving the information relating to the plurality of vehicles in the area, the processor is further configured to:
receive information from a plurality of on-board diagnostics (OBD) devices associated with the plurality of vehicles, wherein the information from the plurality of OBD devices includes, for a particular vehicle of the plurality of vehicles, at least one of:
a Real-Time Kinematic (RTK) position for the particular vehicle;
a heading for the particular vehicle;
a speed for the particular vehicle;
an acceleration for the particular vehicle;
a type of vehicle for the particular vehicle; or
a vehicle component status for the particular vehicle.

14. The device of claim 12, wherein, when receiving the information relating to the plurality of vehicles in the area, the processor is further configured to:
receive object detection information from a plurality of cameras, wherein the object detection information includes information identifying a location of an object and information identifying the type of object, wherein a type of object includes at least one of a vehicle, a pedestrian, or a bicycle.

15. The device of claim 12, wherein the processor is further configured to:
obtain traffic light information from a plurality of traffic light controllers located in the area,
wherein, when using one or more trained machine learning models to determine the likelihood of collision by one or more of the plurality of vehicles, the processor is further configured to input the obtained traffic light information into the one or more machine learning models.

16. The device of claim 12, wherein the processor is further configured to:
obtain at least one of pedestrian information for a plurality of pedestrians in the area, bicycle information for a plurality of bicycles in the area, or electric scooter information for a plurality of electric scooters in the area,
wherein, when using the one or more trained machine learning models to determine the likelihood of collision by one or more of the plurality of vehicles, the processor is further configured to input the obtained at least one of the pedestrian information, the bicycle information, or the electric scooter information into the one or more trained machine learning models.

17. The device of claim 12, wherein the device is located in a Multi-Access Edge Computing (MEC) network associated with a base station, wherein the information relating to the plurality of vehicles is received via Fifth Generation (5G) New Radio (NR) wireless signals by the base station, and wherein the alert is transmitted by the base station using 5G NR wireless signals.

18. A system comprising:
   a Fifth Generation (5G) New Radio (NR) base station; and
   a Multi-Access Edge Computing (MEC) device, coupled to the 5G NR base station, configured to:
      receive, via the 5G NR base station, information relating to a plurality of vehicles in an area;
      use one or more trained machine learning models to determine a likelihood of collision by one or more of the plurality of vehicles, wherein the one or more trained machine learning models are trained using a plurality of simulated collision danger situations, and wherein the one or more trained machine learning models include a machine learning model trained to predict future trajectories for particular ones of the plurality of vehicles, wherein the machine learning model is configured to use as input a first set of input elements that represent telemetry measurements for the particular ones of the plurality of vehicles and a second set of input elements that includes changes in location for the particular ones of the plurality of vehicles;
      identify one or more vehicles of the plurality of vehicles based on the determined likelihood of collision; and
      send, via the 5G NR base station, an alert indicating a danger of collision to at least one of the identified one or more vehicles.

19. The system of claim 18, wherein the machine learning model is trained using fields of view for vehicles in particular collision danger situations to determine a likelihood a driver of a first vehicle will notice a second vehicle in a collision danger situation.

20. The system of claim 18, wherein the plurality of simulated collision danger situations includes one or more of:
   a pedestrian ahead situation,
   a left turn situation,
   a lane change situation,
   an intersection movement situation,
   an emergency braking ahead situation,
   a do not pass situation, or
   a blind intersection situation.

* * * * *